United States Patent [19]

Wagner et al.

[11] Patent Number: 4,621,339
[45] Date of Patent: Nov. 4, 1986

[54] SIMD MACHINE USING CUBE CONNECTED CYCLES NETWORK ARCHITECTURE FOR VECTOR PROCESSING

[75] Inventors: Robert A. Wagner, Durham, N.C.; Charles J. Poirier, Red Bank, N.J.

[73] Assignee: Duke University, Durham, N.C.

[21] Appl. No.: 503,654

[22] Filed: Jun. 13, 1983

[51] Int. Cl.$^4$ .............................................. G06F 15/16
[52] U.S. Cl. .................................. 364/900; 364/489; 364/490
[58] Field of Search ... 364/200 MS File, 900 MS File, 364/488–491

[56] References Cited

U.S. PATENT DOCUMENTS

| | | | |
|---|---|---|---|
| 4,128,880 | 12/1978 | Cray, Jr. | 364/200 |
| 4,314,349 | 2/1982 | Batcher | 364/716 |
| 4,365,292 | 12/1982 | Barnes et al. | 364/200 |
| 4,380,046 | 4/1983 | Fung | 364/200 |
| 4,412,303 | 10/1983 | Barnes et al. | 364/900 |
| 4,435,758 | 3/1984 | Lorie et al. | 364/200 |
| 4,435,765 | 3/1984 | Uchida et al. | 364/200 |
| 4,484,262 | 11/1984 | Sullivan et al. | 364/200 |
| 4,498,134 | 2/1985 | Hansen et al. | 364/200 |
| 4,523,273 | 6/1985 | Adams, III et al. | 364/200 |

OTHER PUBLICATIONS

G. E. Carlsson et al, Interconnection Networks Based on a Generalization of Cube Connected Cycles, IEEE Transactions on Computers, (vol. C-34, No. 8, Aug. 1985), pp. 769-772.

T. C. Chen et al, *Parallel Table Directed Translation*, IBM Tech. Disclosure Bull., (vol. 22, No. 6, Nov. 1979), pp. 2489-2490.

T. C. Chen et al, *Parallel List Transfer Using Vector Processing*, IBM Tech. Discl. Bull., (vol. 22, No. 6, Nov. 1979), pp. 2491-2492.

*Primary Examiner*—James D. Thomas
*Assistant Examiner*—A. E. Williams, Jr.
*Attorney, Agent, or Firm*—Oblon, Fisher, Spivak, McClelland & Maier

[57] ABSTRACT

A single instruction, multiple data stream parallel computer using bit-serial arithmetic whereby the machine's basic operation is performing Boolean operations on huge vectors of 0's and 1's. The machine utilizes an architectural approach whereby the memory of a conventional machine having $2^k$ words each t bits long, is reorganized into p registers each $2^k$ bits in length and adding processor logic to each bit position of the registers and a communication network being added which allows for the $2^k$ pieces of processing logic to interact. This machine is capable of executing a wide variety of algorithms at a speed of $2^k/p$ to $2^k/p^2$ faster than conventional machines. The machine provides for an ability to handle a variety of algorithms by interconnecting the individual processor elements in a general interconnection network capable of performing a permutation of n bits held one in every processor element in a time of (O(log(n)).

7 Claims, 14 Drawing Figures

FIG. 1
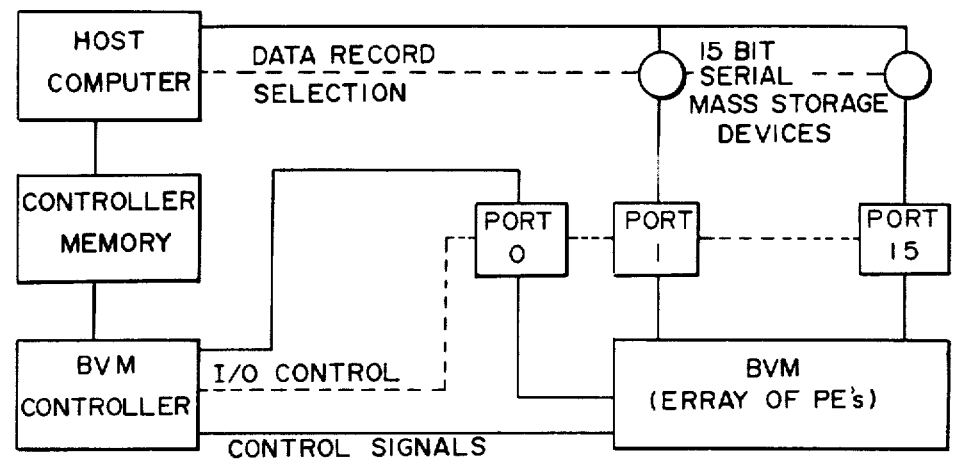
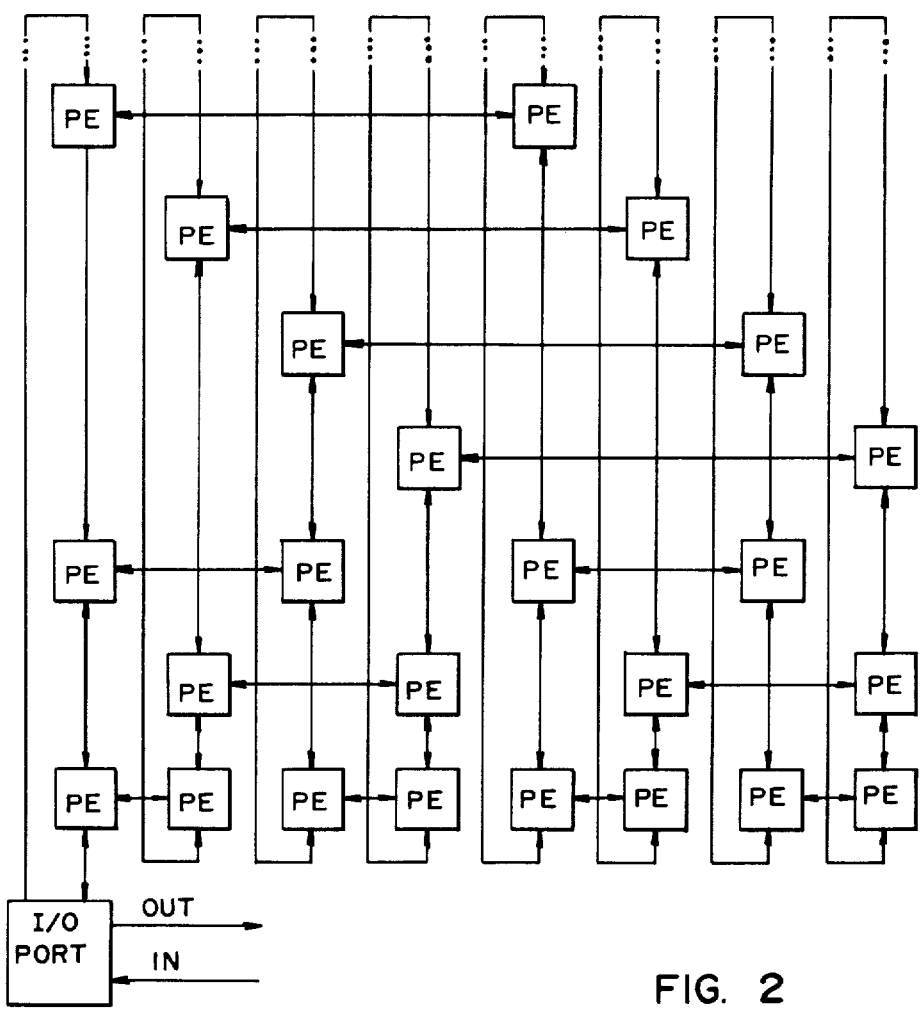
FIG. 2

SIMD MACHINE USING CUBE CONNECTED CYCLES NETWORK ARCHITECTURE FOR VECTOR PROCESSING

BACKGROUND OF THE INVENTION

1. Field of the Invention

The present invention relates to a single instruction, multiple data stream parallel computer.

2. Description of the Prior Art

The history of the development of digital computers is replete with examples of attempts to maximize operating speed, i.e., the amount of data that can be processed in a unit of time. The two important limitations on the developments of this area concern the component speed and the serial machine organization. Improvements in the area of integration have provided for a possibility of increased operating speed while the improvements concerning the serial machine organization have been directly tied to improvements in the execution times of serial instruction strings.

Functional features such as index registers, associative memories, instruction look-ahead, high-speed arithmetic, algorithms, and operand look-ahead have been employed to expedite extension of the instruction strings. This type of "pipe-lining" of computers has reached a practical limitation in the application of these features. An example of this "pipe-line" is the CRAY-1.

Other examples of machines presently available which attempt to utilize the most recent developments in parallel processing include the DAP, STARAN, and the massively parallel processors (MPP), which use bit-serial communications between processing elements arranged in a large array as a communications network. These machines are distinguished from each other and from other machines by their powerful processing elements (PE), the amount of memory per processing element, and their intercommunication network.

One of the problem areas with regard to these machines is that any work being done on arrays greater than $2^{12}$ element causes the speed of execution to be constrained by the communication network. That is, the DAP, STARAN, and MPP are limited in algorithms whose communication paths can be mapped onto a rectangular grid.

It has been recognized by Pratt in "A Characterization of the Power of Vector Machines," Proceedings of the Sixth Annual ACM Symposium on Theory of Computing, Seattle, Wash., Apr. 30–May 2, 1972, pp. 122–134, that a "new" model of the random access machine called a Boolean vector machine could be used to provide for bitwise parallel Boolean operations. Their theoretical discussion indicated that Boolean vector machines of unlimited register length could solve all problems in NP in time polynomial in the problem sized. (NP is the class of language recognition problem solvable by non-deterministic Touring machine in polynomial time). The class NP includes problems for which deterministic polynomial-time solutions have long been sought without success. The revelations of Pratt indicated that a vector machine model could solve in time $t^2$ any problem solvable by Touring machine in space t.

This theoretical construction of a vector machine by Pratt did not provide for any finite realizations of Boolean vector machine and certainly not any architecture which was able to accomplish the theoretical results.

Thus, there has been no architectural realization of the indicated possibilities with regard to providing a Boolean vector machine able to utilize any of the principles set forth by Pratt.

SUMMARY OF THE INVENTION

Accordingly, one object of the present invention is to provide a novel architecture of a class of machines intended to solve computationally intensive problems faster than existing machines at no increase in cost.

It is also an object of the present invention to utilize an architectural approach whereby the memory of a conventional machine having $2^k$ words each p bits long, is reorganized into p registers each $2^k$ bits in length and adding processing logic to each bit position of the registers and a communication network being added which allows for the $2^k$ pieces of processing logic to interact.

It is also an object of the present invention to provide an architecture which is capable of executing a wide variety of algorithms at a speed of $2^k/p$ to $2^k/p^2$ faster than the conventional machine. It is also an object of the present invention to provide a machine which is able to handle a variety of algorithms by interconnecting the individual processor elements in a general interconnection network capable of performing a permutation of n bits held one in every processor element in a time of $O(\log(n))$.

It is a further object of the invention to provide an architecture for a machine which is asymptotically silicon-area-efficient for many large classes of algorithms which results in a given amount of silicon-area being organized into a machine which will execute any algorithm from these classes faster than with the same area of silicon organized as in any of the prior art machines.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 1 is a system configuration of the Boolean vector machine;

FIG. 2 illustrates the interconnection of a portion of a Cube Connected Cycle network with an associated I/O port connection;

DESCRIPTION OF THE PREFERRED EMBODIMENTS

Figure 3:
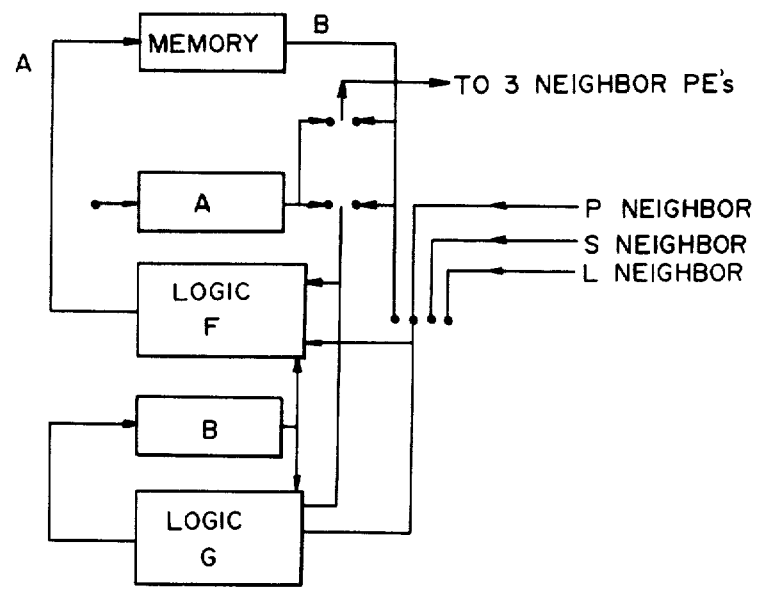
FIG. 3 is a block diagram of a processor element (PE).

Referring now to the drawings, wherein like reference numerals designate identical or corresponding parts thereof of the several view and more particularly to FIG. 1 thereof there is illustrated a Boolean vector machine system in a block diagram form. The Boolean vector machine 1 is operated through the controller 2 which may consist of an Ikonas Graphics Microengine Model BPS-32 computer. This Microengine is equipped with 4K words, each 64 bits wide, which can be read out at a 10 MHz rate. The inputting and outputting controls functioning through the ports 3 in order to provide control between the controller 2 and the BVM 1. A host computer which may be a PDP-11/34 Digital Equipment Corp. device provides through the controller memory 4 the environment in which the BVM machine is to operate. The serial mass storage devices 6 are normally provided with disk drives such as Winchester disk drives connected between the ports 3 and the host computer 5 with the exception of the port which is connected to the input/output control from the controller.

In order to define a particular Boolean Vector machine which is being utilized, it is necessary to define the number of registers in the machine and the type of interconnection network being employed to join processing logic at different bit positions including the topology and the width of each of the logical connections. Lastly, the instruction set which may be executed by the machine is necessary to be known.

In a preferred embodiment, each PE of the BVM consists of 128 addressable registers, each 1-bit wide and is used to compute two 3-argument Boolean functions in each instruction. The network topology employed in the preferred embodiment is a Cube Connected Cycles Network. Such a network is illustrated in the article entitled, "The Cube Connected Cycles; a Versatile Network for Parallel Computation in Communications of the ACM," May 1981, Vol. 24, No. 5, pp. 300–309.

The network implemented in the present invention is such that most of its logic connections are 1-bit wide and use two wires so that bits held by neighboring PE's can be exchanged easily.

The FIG. 2 illustrates a portion of a Cube Connected Cycle (CCC) network having an input/output port connection 10 to a cycle fragment set of two t PE's per cycle with three PE's per cycle being illustrated in FIG. 2.

The program for the PE's are held in the controller 2 which sends the same orders to all PE's at once as illustrated from FIG. 1. The single instruction stream, multiple data stream mode of operation is important in reducing the amount of memory needed by each processor element. It also permits all processor elements on one chip to share the silicon area devoted to memory address decoders.

From a programmer's viewpoint, the BVM consists of 128 numbered registers R[0] . . . R[127], plus two accumulator-like registers called A and B. The ith bit position of all these registers together with the ith processing logic circuit is termed the processing element i or $PE_i$ of the Boolean vector machine. The size of a particular Boolean vector machine is the number of PE's it consists of equal to $2^k$ for an integer k.

The Boolean vector machine is capable of executing in one memory cycle an instruction of the general form:

$T_i, B_i \leftarrow f(A_i, B_i, R[j]_i), g(A_i, B_i, R[j]_i)$, where T may be $A_i$ or R[j]. This generalized instruction computes two Boolean functions f and g, specified as part of the instruction of three Boolean variables. The functions f and g are applied in a bitwise parallel fashion replacing the ith bit of register B by the result of g, applied to the ith bits of register A, B and R[j]. At the same time, f is computed and its result replaces the ith bit of register A or of register R[j], depending on the form T takes.

Additionally, the programmer can use a variation of the basic instruction format which replaces the argument $R[j]_i$ to functions f and g with either $A_{N(i)}$ or $R[j]_{N(i)}$, where N(i) denotes a PE which is a neighbor of $PE_i$ in the interconnection network. In the Cube Connected Cycles network (CCC) each PE has three immediate neighbors which are denoted as P(i), S(i) and L(i). The P and S neighbors of $PE_i$ are adjacent to i in the same cycle and are respectively i's predecessor and successor neighbors. Processor L(i) is i's lateral neighbor in a different cycle of the CCC but at i's cycle position.

The Cube Connected Cycles network has a high I/O band width achieved by breaking the link between two PE's of a cycle with an input/output switch so that bits which are sent to the switch are passed to an output device while bits received from the switch in the ON position come from an input device. Thus the CCC can attach any bit serial input/output device to a cycle with the switch reconnecting the network and bypassing the input/output device when the input/output is not in progress. This scheme allows the connection of almost any number of serial input/output devices such as disk drives to the CCC. Then all of the connected devices or selected subsets of them are able to function in parallel, thus providing a high data rate.

A particular embodiment uses a scheme whereby one input/output device is connected to each of the identical "logic boards" from which the BVM array is constructed. Each logical board contains $2^8$ cycle fragments, each consisting of eight PE's. A shift pattern has been devised using connections of the CCC network present on one logical board which essentially links all $2^{11}$ PE's together into one huge shift register. During an I/O operation, the BVM controller issues a "general" sequence of orders to all PE's. Each PE is programmed with knowledge of which of the three neighbors it should accept data from, in order to implement the shift-register pattern. It then uses its logic function array, and its memory-enable register to arrange to obey the appropriate "I/O and shift" order.

Figure 13:
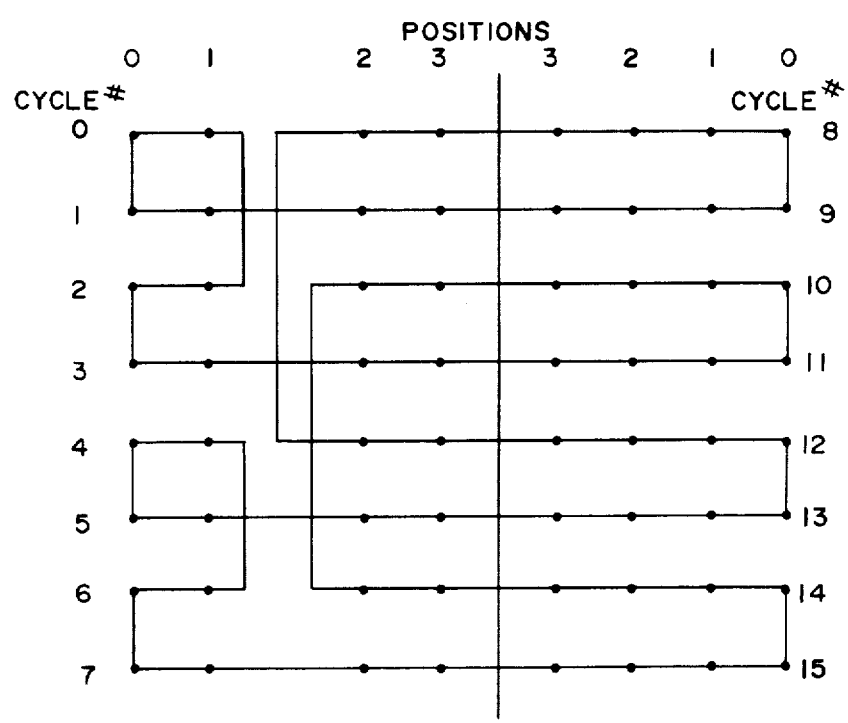
FIG. 13 illustrates an example of an input/output shift pattern for sets of $2^t$ fragments.

An example of an I/O shift pattern which has been devised with the required properties, for sets of $2^{2t}$ cycle fragments, each cycle fragment consisting of 2t PE's for every integer $t \geq 0$ as shown in FIG. 13 which is specifically designed for t=2.

One of the additional instruction variants permits $R[j]_i$ to replace argument $A_i$ of the logic functions. A provision is also made in each instruction for causing the PE to ignore part or all of the instruction based on the state of the PE "enable" register or on the wired-in position of the PE within a cycle of CCC network. The logical interconnections of the functional blocks of a PE is illustrated in FIG. 3 wherein a steering circuit is shown for each PE and all four switches which are shown are externally programmed as are the logic functions computed by the logic F and the logic G blocks. All of the PE's receive identical steering, memory address and logic function control signals during each instruction.

The steering circuit aside from the logic f and logic g which constitutes a computation of three argument Boolean vectors also uses the logic accumulator registers A and B which are 1-bit in length as well as the memory cell which may be considered to constitute a column of memory cell. This is further illustrated by the FIG. 4.

Figure 4:
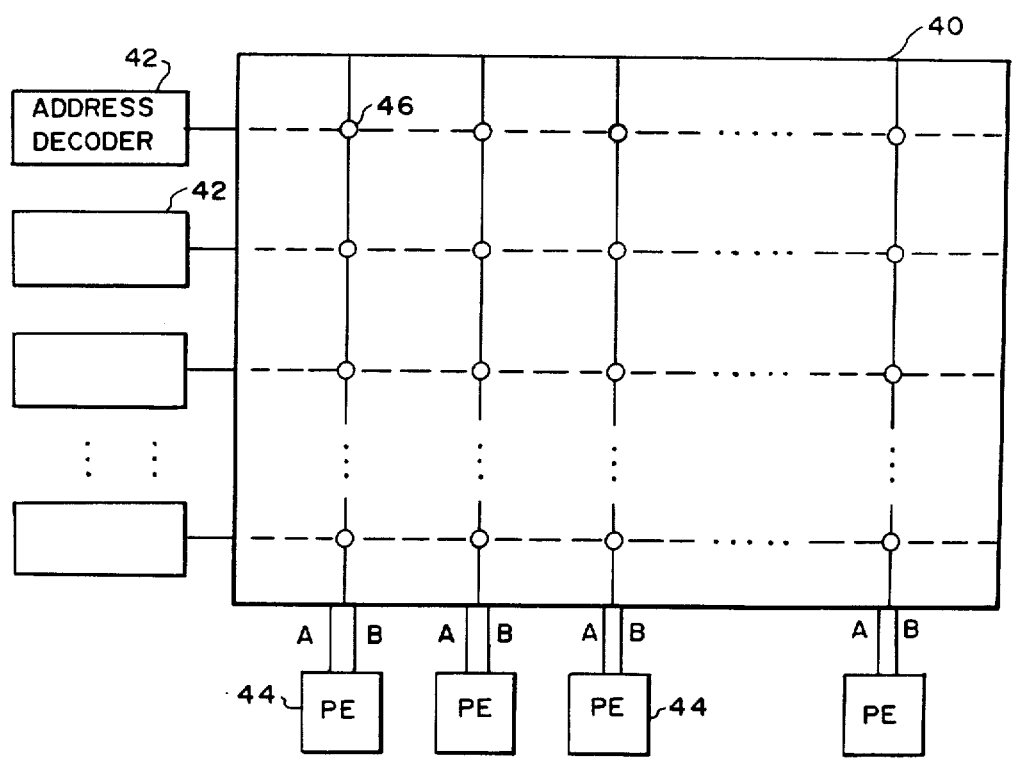
FIG. 4 is a illustration of the memory portion of the Boolean vector machine and its association with processor elements and addressable decoders.

The memory portion of the BVM and its relationship with the processor elements and the address decoders of the system are shown in FIG. 4. The memory 40 consists of rows and columns of memory elements wherein each of the address decoders 42 are associated with a particular row of memory elements and each of the processing elements 44 are associated with a column. The processor elements have an input line A and an output line B to each of the columns of the associated memory elements. These input and output lines labeled A and B correspond with the labeling of A and B in FIG. 3 with the memory element 37 which consists of at least one column of memory elements. The FIG. 4 illustrates the memory elements or memory cells by the small circles labeled 46. Because of the nature of the Boolean vector machine, each element in a particular row is called a memory vector cell which is associated with each of the address decoders.

Figure 5:
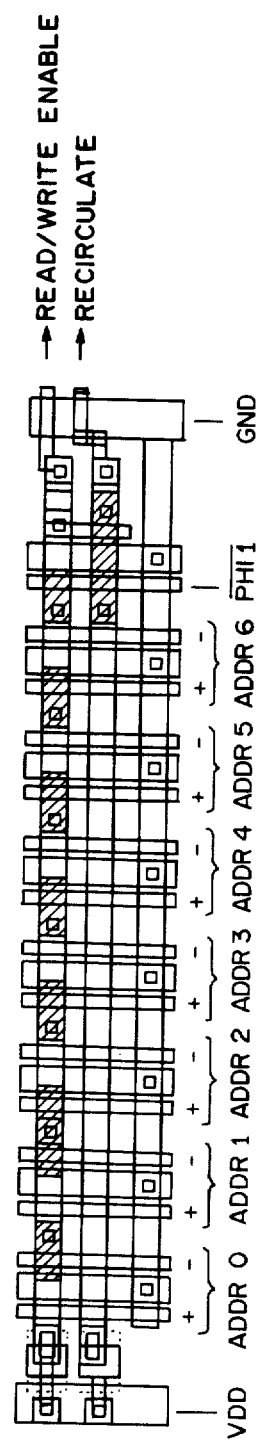
FIG. 5 is an example of an address decoder cell of FIG. 4.

One of the address decoder cells 42 of FIG. 4 are illustrated in the example shown in FIG. 5 for the specific address "3". One of the address decoder cells is used for each of 128 addressable memory vectors and these 128 addressable decoder cells in a particular embodiment provide the function of enabling one memory vector to read and write while enabling all other memory vectors to refresh their data. The selection of the memory vectors is based upon the values of the seven address bit inputs to the particular BVM chip. The true and complementary values of each address bit pass through each address decoder cell as does the complement of the clock signal.

There are two outputs from address each cell, a Read/Write enable (R/W) and a Recirculate enable (RC). Both outputs must remain low while the clock is low. When the clock signal labeled Phi-1 is high, R/W must be high only if the address bits match the vector address associated with that address decoder cell and RC must equal NOT(R/W). The outputs are implemented by means of two NOR gates per cell.

Figure 6:
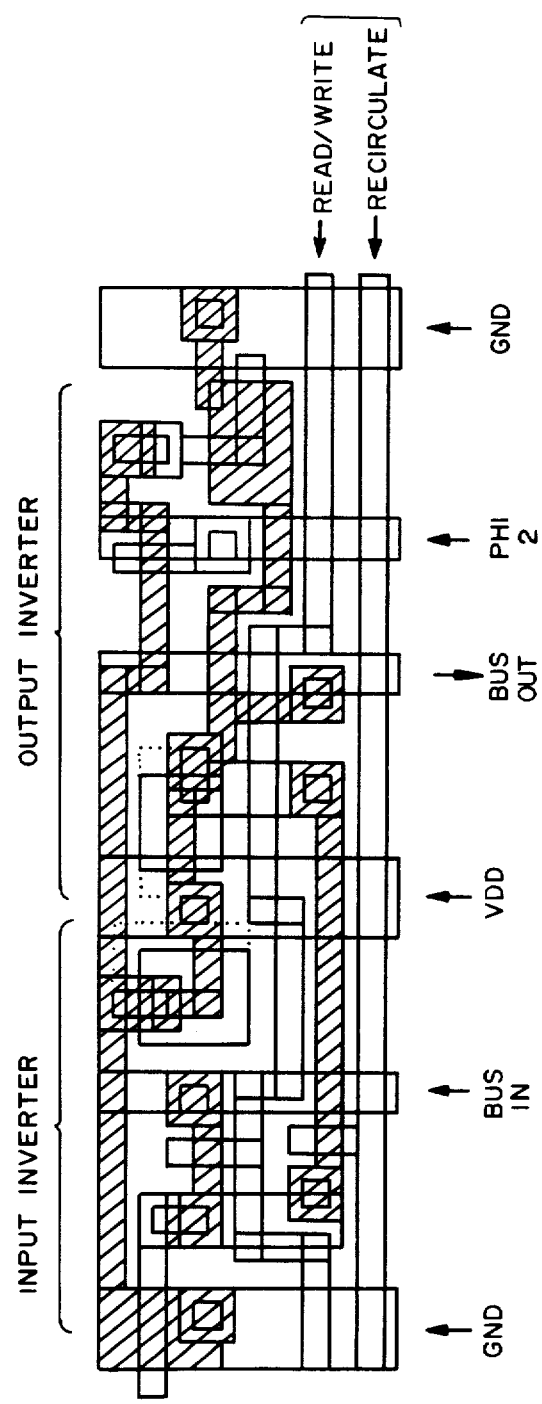
FIG. 6 is an illustration of the construction of a memory cell illustrated in FIG. 4.

Each of the memory vector cells formed in FIG. 4 is shown in FIG. 6 wherein the cell stores one bit of data by means of two cross-coupled inverters separated by opposed non-overlapping clock phases. Three clock signals pass through the cell: Phi-2 clock and two others, Read/Write enable (R/W) and Recirculate enable (RC) which are both ANDed with Phi-1 clock. Two data buses pass through the cell, Bus Out for the cell's output and Bus In I for input to the cell.

During Phi-1 clock, a data bit is read from the output inverter into one of two paths, either Bus Out or a recirculation path within the cell. Simultaneously, a data bit is fed into the input inverter for one of two sources, either Bus In or the recirculation path. During Phi-1, if RC is high then the recirculation path is active and R/W is low, isolating the cell from Bus Out and Bus In. If R/W is high, then the memory vector of which the cell is a part is being addressed and therefore the cell's value is placed on Bus Out and a new value is loaded from Bus In. As will be seen from the accompanying description of FIG. 7 which concerns the register switching cell, the Bus Out can be connected to Bus In to allow a recirculation of memory vector cells which are being addressed. Placement of this secondary recirculation function outside of the memory provides a significant savings in silicon area.

The memory vector cell has a flat, wide shape in order to permit 128 of them to be stacked together within the confines of a reasonably squared chip. The cell can be wide because only 32 columns of them are needed to be placed side-by-side in this embodiment.

Figure 7:
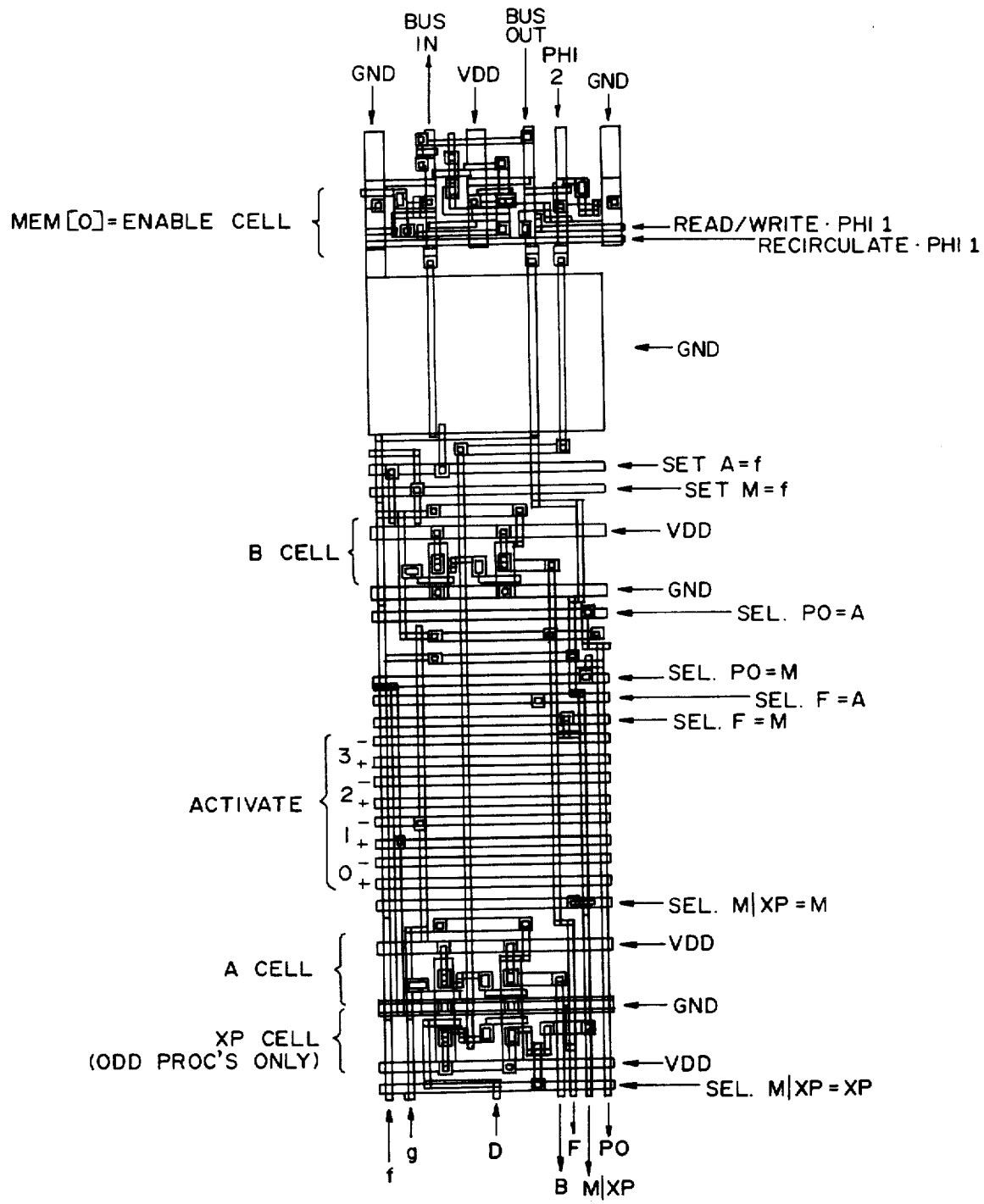
FIG. 7 is an electrical construction diagram of a register switching cell illustrating portions of the steering circuit of FIG. 3.

The FIG. 7 illustrates the register switching cell which constitutes a portion of the steering circuit of FIG. 3. The register switching cell as can be seen from the FIG. 7 contains the A and B cell portion of the FIG. 3 as well as its connection to the memory enable or the memory columns as illustrated by the memory 37 of FIG. 3. The register switching cell performs the function of both memory and switching with one bit of memory being provided for each of the A and B registers. Odd-position processors also are seen to have a bit of memory for the XP register. The memory vector cell for the address of 0 is included in the register switching cell because its value is used as an enable signal to help determine whether an address memory vector (other than 0) recirculates its data or loads new data.

The A register cell and B register cell functions similarly to the memory vector cell. Two control signals, each ANDed with Phi-1 clock, determine whether the cell receives a new value or recirculates its old value. A Phi-2 clock separates the two inverter stages. The XP cell differs by having no recirculation path. It is loaded on each Phi-1 clock cycle with the value of the D-input to the logic function generator cell which is described in the FIG. 8. The XP cell's data can be read out during the next clock cycle to serve as the next D-input.

The following switching functions are provided by the register switching cell:

a. Enable versus Recirculation of addressed memory; the value of memory vector 0 determines whether or not address memory vector other than 0 recirculates its current value or loads new data. If memory [0] equals 0, then the Bus Out signal is gated onto the Bus In path and the Bus In path is cut off from any input from the logic function generator. If memory [0] equals 1, Bus In is cut off from Bus Out and the output of the function generater (if it is not cut off by any other switching functions of the register switching cell) is gated on to Bus In.

b. Processor activation versus deactivation; processors on the BVM chip are associated into 8 groups (cycle fragments) of four processors per cycle fragment. Processors within each cycle fragment are identified by their position within that fragment, from 0 to 3. Four activate control signals enter the BVM chip, corresponding to the four cycle fragment positions. The activate signals (and their complements) pass through their register switching cell. One activate/complement pair is connected to gates in any one particular register switching cell such that the processor position matches the activate signal position. The connected activate signal determines whether the A register and the B register cells as well as the addressed memory vector cell of the processor recirculate their current data or receive new data for the logic function generator cell.

If activate equals zero, the output of the A and B register cells are each gated back to their respective inputs, and the bus-out signal is gated to the bus-in. If on the other hand activate equals one, the B register cell receives the g-function output of the logic function generator cell. The f-function output is gated onto a path in the register switching cell from which it is available to be switched into either the A register or bus-in, depending on the action of the other switching functions.

c. Select destination of f-function output; the f-out A input to the BVM chip and its complement signal past throught the register switching cell. This signal allows the f-function output to be loaded either into the A register or the addressed memory vector cell. When f-out A equals one, the f-function output of the logic function generator cell is gated into the A register cell input (subject to processor activation), while bus-out is gated into bus-in to recirculate addressed memory. When f-out A equals zero, the A register cell output is gated into its input and the f-function output is gated into bus-in (subject to processor activation A and memory enabling E).

d. Select source of processor output; the P-out A input to BVM chip and its complement signal pass through the register switching cell. It selects either the A register data or the addressed memory vector cell data to be gated onto the processor output path which leaves the processor. Data on the processor output path can be switched onto the D-input path of one of three other processors. When the P-out A equals one, the A register output is switched onto the processor output path and when the P-out A equals zero, bus-out is switched onto the output path.

e. Select F-input to logic function generator; the F-in-A input to the BVM chip and its complement signal pass through the register switching cell and determine which of two sources is gated into the F-input of the logic function generator cell. When F-in A equals one, the A register output is gated in and when F-in A equals zero, the addressed memory vector cell is selected by gating in bus-out.

Figure 14:
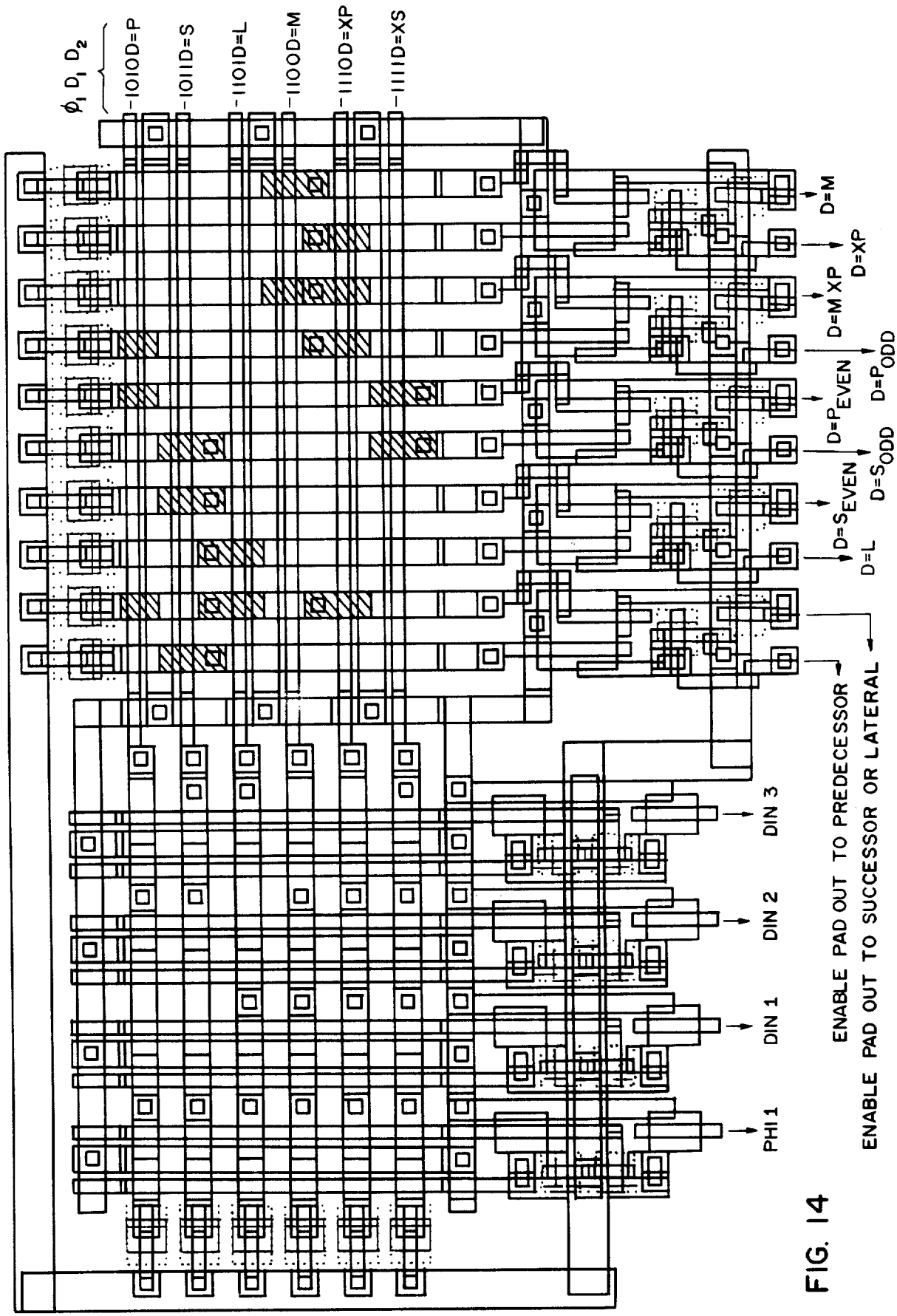
FIG. 14 is an electrical construction diagram of a D-input Selector PLA.

The FIG. 14 shows the electrical construction and make-up of the D-input selector PLA (Processor Logic Array) which receives the control signals from four inputs to the BVM chip: Phi-1 clock, and DIn-1, -2, and -3.

When Phi-1 clock is low, all the PLA outputs are 0. When Phi-1 clock is high, the DIn control signals determine one of six possible patterns of data communication between processors. The data communication pattern is implemented by choosing a D-input data source for each Logic Function Generator cell. The possible choices and their DIn codes are as follows:

| D1D2D3 | D-input | Explanation |
| --- | --- | --- |
| 0 1 0 | D = P | use Processor Output from the Predecessor processor |
| 0 1 1 | D = S | use Processor Output from the Successor processor |
| 1 0 1 | D = L | use Processor Output from the Lateral processor |
| 1 0 0 | D = M | use the value of the local processor's addressed Memory |
| 1 1 0 | D = XP | even-position processors use Processor Output from their Predecessor processor; odd-position processor use the output of their own XP Register |

-continued

| D1D2D3 | D-input | Explanation |
| --- | --- | --- |
| 1 1 1 | D = XS | cell even-position processors exchange Processor Outputs with their Successor processor |

Ten signals are generated by the D-input Selector PLA, which control the selection of a D-input to the Logic Function Generator.

Two of these signals pass through the Register Switching Cell. They are the D-inputM and D-inputXP signals. If one of these signals = 1, it switches the output of Bus Out or the XP Register, respectively, onto the MorXP data line. This line passes from the Register Switching cell into the Logic Function Generator cell.

A third output of the D-input Selector PLA, called D-inputMorXP, passes through the Logic Function Generator cell. When high, it gates the MorXP data line into the D-input.

The fourth, fifth, sixth, seventh, and eighth outputs of the D-input Selector PLA pass through the Local Processor Cell. They are called EvenDP, OddDP, Even DS, OddDS, and D-inputL.

The DP signals cause the Processor Output of the Predecessor processor to be gated into the D input of Even- or Odd-position Logic function Generators.

The DS signals do the same thing with the Processor Output of the Successor processor. Both the Odd and Even signals, or just one, may be high simultaneously, depending on which communication pattern is selected by the DIn inputs.

The D-inputL signal causes the Processor Output of the Lateral processor to be gated into the D input, whether Odd or Even.

The ninth and tenth outputs of the D-input Selector PLA are called OutSL and OutP. OutSL passes through the S/L IO Pads.

When OutSL is high, the Processor Output of each processor in position 3 of its Cycle Fragment is gated into its S/L IO Pad, and the pad is enabled for output. This occurs during a P, XP, or L data communication.

When OutP is high, the Processor POutput of each processor in position 0 of its Cycle Fragment is gated onto its P IO Pad, and the pad is enabled for output. This occurs during an S data communication.

Figure 8:
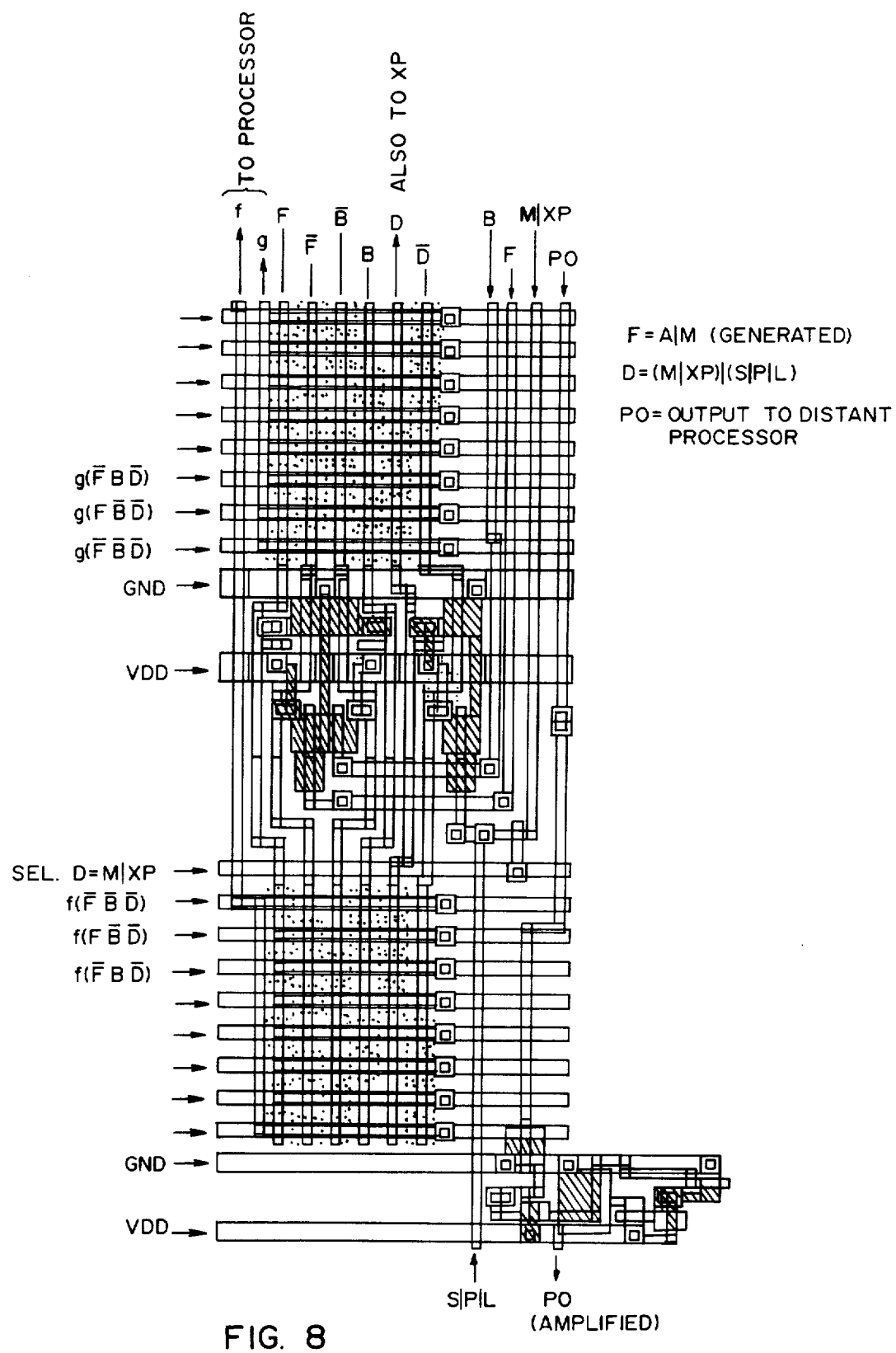
FIG. 8 is an illustration of the logic function generator portion of the steering circuit of FIG. 3.

The logic function generator of FIG. 8 is used to compute the value of the function f (F, B, D) and g (F, B, D) for its processor. It also supplies the value of its D input as the input to the XP register cells of odd position processors. An amplifier for the processor output is included in the cell although it is unrelated to the logic circuit. Each of the incoming F, B and D inputs drive an inverter pair which provides an amplified true and complemented version of each input.

The f-function output is generated by one logic sub-cell. The g-function output is generated by another logic sub-cell which is identical except for mirroring. Both logic sub-cells are driven by the same F, B, D and their complement signals. The f or g logic sub-cell generates its logic function on the basis of its own set of eight function Minterm signals which are inputs to the BVM chip. The logic sub-cell works by selecting one of eight function Minterm signals as the cells output, based on the value of the F, B and D inputs.

Each function Minterm signal is connected with the logic sub-cell to a path on the diffusion level. All eight paths are crossed by each of the F, B, D and their complement signals in polysilicon. Thus six gates are placed in series on the diffusion path from each function Minterm. Of each set of six, ion implantation is placed on three of the gates. One gate from each signal/complement pair is ion implanted, such that if the value of F, B and D which the Minterm represents is present, then that diffusion path will conduct through all six of its states.

The ends of the eight diffusion paths, opposite from the ends connected to the function Minterm, are all connected together. This forms the wired-OR of the output of the eight diffusion gates. This is also the output of the logic sub-cell. A wired-OR is used because it is very compact and because of the fact that exactly one of the diffusion gates is turned on for any value of F, B, and D.

The use of ion implanted gated to implement the selector in the logic sub-cell is utilized because it results in a compact layout. Alternate designs for the selctor have been created which would use fewer ion implants at the expense of somewhat large silicon area. The use of fewer implants improves the speed of the logic sub-cell.

In order to use the architecture to obtain arithmetic, the convention is adopted that a sequence of memory registers $R[X_0+p-1]$ are used to represent a vector X of $2^k$ p-bit numbers. Bit j of the ith component of such a vector is found at the ith bit of register $R[X_0+j]$. Arithmetic on vectors can then be programmed by writing a loop to perform it in bit-serial fashion. The loop-control statements are in effect executed by the controller and are time overlapped with BVM operations. The statements for loop control are taken from the language "C" in writing programs. This language is recited and disclosed in Kernighan and Ritchei, *"The C Programming Language"*, Prentiss-Hall (1978).

As an example of these type of statements in order to add vector Y to vector X as in the APL statement X←X+y the following loop is written

```
B ← 0
for j = 0 to p−1 do [
    a ← R[Y0+j];
    R[X0+j],B ← ODD(A,B,R]X0+j]),
        MAJ(A,BR[X0+j]);
```

The ODD(x,y,z) is defined as $(x+y+z) \mod 2$ and MAJ(x,y,z) is defined as $(x+y+z)>1$. Thus this loop simulates bit-serial addition in 2 p BVM references on vectors or lengths $2^k$. Other more elaborate arithmetic operation can be built up systematically in similar fashion.

The previously described architecture and its implementation is most easily implemented using the Very Large Scale Integration VLSI technology. (For example, in the version disclosed in Mead, Conway "Introduction to VLSI Systems" Addison-Wesley 1980). The "parallel access" capability to memory is necessary and the CCC network presents very little difficulty when the number of PE's per chip and board are kept "small" (less then 50,000).

The parallel memory access features of the architecture work in a fashion similar to that of the present MOSFET memory chips. Many such chips $2^{2t}$ bits of memory are implemented as an array of $2^t$ vectors, each $2^t$ bits long. An address of $2^t$ bits is separated into an x coordinate and a y coordinate, each t bits long. The value of x is used to select one of the vectors. All of the bits of the selected vector as then read out, in parallel. In an ordinary access to memory the value of y is sent through a secondary select circuit to choose one of the bits of the x vector.

The parallel readout capability allows the chips refresh cycle to operate efficiency. However, in the BVM is order to take advantage of this technique the secondary selection circuit has been replaced with logic devices capable of implementing the general Boolean operations f and g. 128 transistors are needed to make the logic circuit thus occupying the space needed for approximately 128 bits of memory. This architecture comes within a factor of 2 of meeting the ideal of an equal silicon-area implementation of the same memory size. If the logic circuit at bit position i of the BVM together with the circuits which realize $A_i$, $B_i$ and $R[0]_i$ ... $R[127]i$ (a bit sliced through the BVM registers) constitutes $PE_i$ of the BVM. A BVM of $2^{20}$PE's, connected in a cube Connected Cycles network of $2^{16}$ cycles, each 16 PE's in length is possible.

The particular embodiment of an interconnection network is chosen to effect the trade off between algorithmic generality and implementation expense. The embodiments provide a network capable of performing an arbitrary permutation on n bits in O(log n) operations. Such a network allows APL (A Programming Language) (Inverson, K. E., A Programming Language (Wiley 1962)) "subscripting" operations such as a X[Y], where X and Y are vectors to be performed quickly. This type of generality is important if a wide class of algorithms is to executed efficiently on the BVM. The interconnection network may not use such a great amount of silicon area or connecting wire that it would dominate the cost of the BVM. The capabilities of the cube connected cycles (CCC) network match these requirements closely.

The article entitled "The Cube-connected Cycles: A Versatile Network for Parallel Computations by Preparata and Vuillemin" indicate how the CCC network performs a pre-determined permutation operation on n bits, one per PE in approximately 8 log n stages, with each stage requiring one or two BVM instructions. In order to reduce the need for internal storage of network-controlling data, the present embodiment adds the capability of "activating" only those PE's in a specific sub-set of the available cycle positions as previously discussed. The sub-set to be specified is part of each BVM instruction. PE's which are not activated by a given instruction do not change their internal state.

A particular version of the CCC implemented in the embodiment shown in the drawings has logical connections which are only one bit wide. This was chosen in view of the bit-serial nature of most BVM operations. It also indicates that the network is, in a practical sense, more conservative in its use of silicon than the article by Preparata indicates.

In order to permit PE's which are neighbors in the CCC to exchange bits in one BVM cycle, each neighbor connection is actually a pair of wires. Furthermore, the PE's are fairly large and allowing 6λ for each wire to include inter-wire spacing, it is estimated that each PE will be 6 wires wide and 250 wires high. The present embodiment has a P-E dimension of 12 wires by 550. If the cube connected cycles network of Preparata is modified as shown in FIG. 3 to group PE's in rows then that scheme provides that the CCCs have t PE's per cycle which require height H and width D where $H=ht+2\times 2^t$ wires, and $W=(w+2)\times 2^t$ wires. The w and h are the width and height respectively, in wires, of 1 PE. In order to prevent the total area devoted to PE's from being dominated by the area devoted to wires it is necessary to determine how large t must be. Until t reaches this determined value, the network size is less than twice the total PT area and can be said to be linear with PE area. With $t_0$ being the smallest value of t such that $2\times$(total PE area)$<H\times W$. This gives $(w-2)ht<(w+2)2^{t+1}$. Using the PE dimensions of the preferred embodiment at $h=550$, $w=12$ and $t_0=12$ it is indicated that $3\times 2^{14}$ PE's are needed before the network total area exceeds twice the total PE area of $79200\times 2^{12}$ wire$^2$. This $t=12$ network is 2.62 times larger than the PE's it contains.

For an embodiment where $h=250$, $w=8$ and $t_0=10$ we have an indication of 10240 PE's being needed. In this instance the PEs occupy areas of $20,000\times 2^{10}$ wire$^2$ while the network occupies total area of $45,480\times 2^{10}$ wire$^2$. This $t=10$ network is 2.27 times larger than the PEs it contains.

Thus the calculation leads to the fact that the chip area of $(40,946\lambda)^2$ would be needed to hold the $h=250$, $w=8$, $t=10$ (10,240 PEs) network. To place this network on a chip of 8 mms on a side (excluding the input-/output pads) would require a $\lambda-0.196$ microns. This value of $\lambda$ is 1/10 the value commonly quoted as the minimum feature size in today's VLSI Technology. Thus the network of the present embodiment requires either multiple chips or silicon areas proportional to PE area. When dealing with multiple chip systems the entire layout question must be reopened. Multiple chips imply I/O pads and attendant area limitations. A multiple-chip design also resides in 3-space where the network volume becomes an important measure rather than network area. In three dimensions, the CCC can be laid out in volume $O((n/\log n)^{3/2})$, by methods developed by Rosenberg in "3-Dimension Integrated Circuitry" in the VLSI Systems and Computation, page 69–80.

The CCC network has partitioning properties which allow it to be conveniently packaged on chips or printed circuit boards. Basically, a CCC network is defined by replacing each of the $2^r$ vertices of a Boolean r-dimension hyper-cube with a cycle of rPE's. The ith PE of cycle C is given the number (C,i), and is connected 2 to 3 PEs numbered (C,i+1), (C,i-1), and (C,.XOR.$2^i$,i). These are its Successor, Predecessor and Lateral neighbors respectively. The lateral neighbors of PE i in cycle C is PE i in that cycle C' whose cycle number differs from C in bit position i only. A set of $2^t$ fragments of different cycles, each of length t, is selected, so that all Lateral connections between the cycle fragements are internal to the set. If t divides r evenly, the entire network of $2^r$ cycles can be implemented with identical chips made of $2^t$ fragments of cycles, each of length t. Furthermore, each such chip requires only two exterior connections per cycle-fragment. This gives rise to chip designs with the following characteristics:

| t | number of processors | number of pins for CCC |
|---|---|---|
| 3 | 3 × 8 = 24 | 16 |
| 4 | 4 × 16 = 64 | 32 |
| 5 | 5 × 32 = 160 | 64 |

Variants with slightly fewer PE's and pins can also be devised. For example, a chip with 4 PE's on each of 8 cycle fragments can be used which uses only 24 pins for CCC connections. At the board level, where pins connected to other boards are also scarce, the same ideal also allows for designs wherein:

| t | number of processors | number of pins for CCC |
|---|---|---|
| 7 | 7 × 128 | 256 |
| 8 | 8 × 256 | 512 |

Other design variants include 8 PEs in each of 128 cycle fragments. This requires 3 pins per cycle fragment, for a total of 384 pins at the board level. The variant scheme which allows only 3 pins per cycle fragment takes advantage of another property of the CCC network. Specifically in the important ASCEND and DESCEND algorithm, only one class of "Neighbor" connections at one time need be active. That is, while a Lateral communication operation is in progress, no Predecessor or Successor communication links are in use. This property allows for sharing of pins in such a way that Lateral exchange operations and Predecessor and Successor shift operations are all possible in single instructions.

Figure 9:
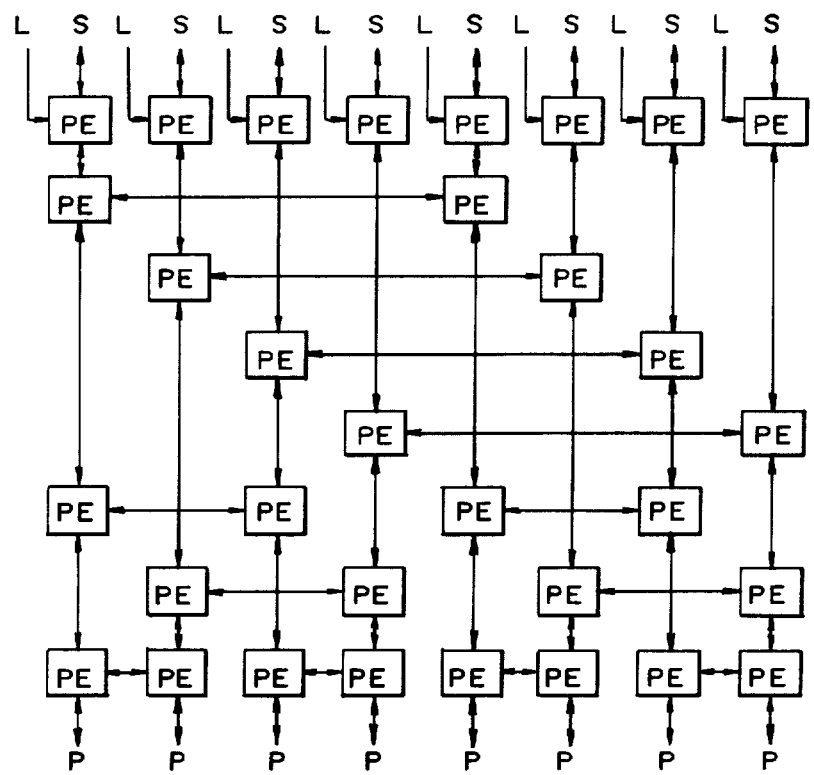
FIG. 9 indicates a preferred embodiment of the communications network in a BVM chip.

The FIG. 9 shows a communications connection in the BVM with a one chip type connected through pins S, L and P which is replicatable to form a CCC network of any cycle-size which is a multiple of 4.

Figure 10:
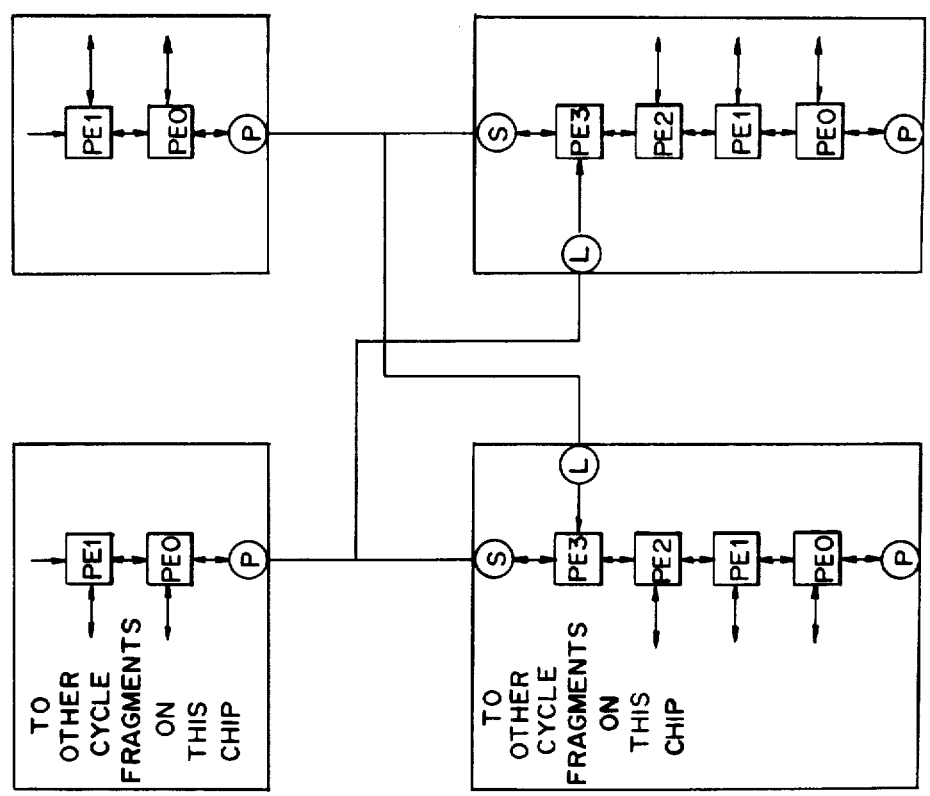
FIG. 10 illustrates the process whereby three pins per cycle-fragment permit a lateral exchange.

The FIG. 10 illustrates Predecessor and Successor as well as lateral L exchange shift operations in single instructions when three pins per cycle-fragment are used. During the lateral exchange, PE3 of each cycle listens to pin L, while placing its own data bid on pin S. During "shift from Successor" operation, PE3 listens to pin S, while PE0 sends data on pin P; during "shift from Predecessor" operation, PE0 listens to pin P, while PE3 sends data on pin 8.

The FIGS. 9 and 10 illustrate a compromise solution to the problem that operations which cause certain PE's to exchange data with their P or S neighbors cannot be performed in one instruction. This was discussed by Preperada in the CCC paper. Specifically, the compromise consist of requiring two instructions for operations which cause PE's at positions 0, 4, 8 and 12 in each cycle to exchange data with their Predecessor (XP operation). This compromise increases the execution time of the algorithms (ASCEND and DESCEND) in the Preparada paper by a factor of less than 5/4.

Both the chip and board designs are highly regular. Choosing a 4-PE per cycle-fragment, 8 or 16-cycle fragment chip allows a $16\times 2^{16}$ PE CCC network to be built from identical chips. If 560 pins can be used per board, the entire network requires 512 identical boards. The same boards can be used to build smaller networks by modifying the inter-board cabling as will be discussed in conjunction with FIGS. 11 and 12.

One of the areas which leads to an improvement in the architecture and in the space use requirements is the "packaging" scheme necessary for the CCC. In one scheme employed in the embodiment, it was found that there was no need for multiplexing pins when up to 64 processors per chip are allowed using the 32-pins per chip mode. This scheme of packaging is characterized as follows:

Each cycle of the CCC is divided into 4-processor fragments; either 8 or 16 such fragments (of different cycles) are packaged on each chip. All the "lateral" connections between the cycles are provided on this chip. Each cycle fragment then uses one pin to communicate with the cycle fragment next following it, and one pin for the fragment preceding it in its own cycle. There is an average of one-half pin per processor (in the 64-processor case). In the 32-processor per chip case, one processor in each fragment cannot have its "lateral" connection performed on-chip because not enough cycles appear on one chip. Instead, for that instance, a method has been found in which 8 lateral connections (which can require two pins per connection) is allowed to "share" the pins need for cycle-fragment connection within cycles. This sharing results in only 24 pins (3 per fragment) being used.

The CCC fits well on individual chips but the connections from one board to another produces limitations based upon the limited number of pins available leaving a board. That is, assuming all lateral connections are completed within the boards, the limitation arises from the limited number of pins which are leaving that board. Thus, each part of a cycle present on a board requires two pins for its within-cycle connections to the rest of the cycles for which it is a part. Thus, in most 148 cycles can appear on one board without multiplexing.

The above considerations lead to a design which is expandable to $2^{20}$ processors, laid out as a complete CCC network with $2^{16}$ cycles of 16 processors per cycle. However, one 128 "cycle fragments" can appear per board, each fragment consisting of 8 processors. This design, again "sharing" some lateral-connections with within-cycle connections, causes approximately $3 \times 128$ pins to be used per board. As an alternative, the network can be limited to a $2^{18}$ processor size in which some 256 pins would be used, per board, for the CCC connections. Because $128 \times 8$ processors appear per board, at 32 per chip, this puts only 32 chips per board.

As previously indicated, one of the design areas which must be considered involves "cabling". In the large systems of $2^{20}$ processors, essentially all "lateral" connections between cycles occur on the boards containing the processors. However, each board has 128 pairs of wires leaving it and every one of these wire-pairs must go to a different board. This problem only occurs when the largest-possible CCC network is to be built with $2^{20}$ processors. Assuming that, 256 8-processor cycle fragments can be squeezed onto each board, without using too many pins, the complete $2^{20}$ processor system consists of some 512 boards, divided into two sets of 256 boards each. Each board in set "8" has a 2-wire connection to every board of set "b". These connections require the design of special connectors and in order to avoid these cabling problems, a preferred embodiment has the size of the network reduced whereby several "groups" of cycle halves can be placed on each board "where connections within groups occur on this board, but no connections between cycle-halves belonging to different groups occur". In this arrangement, the number of pairs of wires joinging a given board to another is increased, to the point where moderately-large cables can be used. However, more total wires are used, or the maximum network size is limited.

Figure 11:
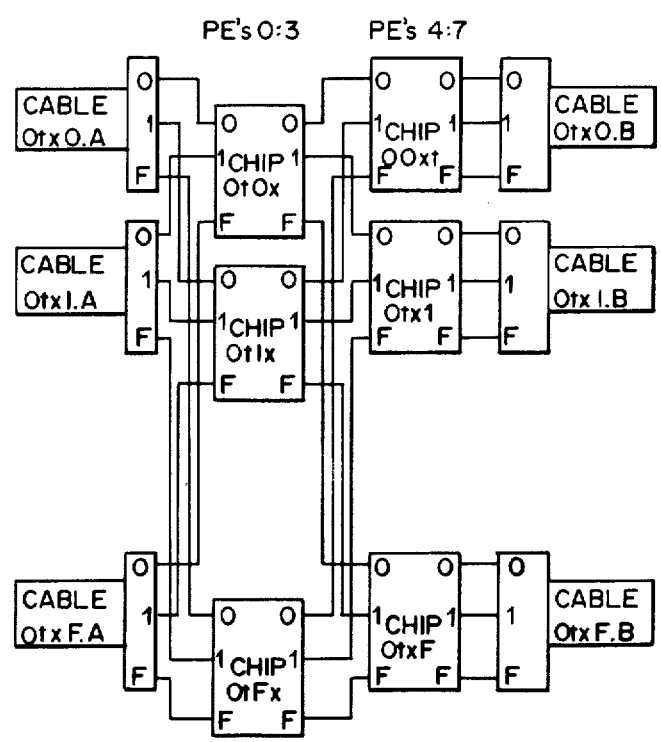
FIG. 11 shows modifications of inter-board cable whereby a low-order board number is illustrated.
Figure 12:
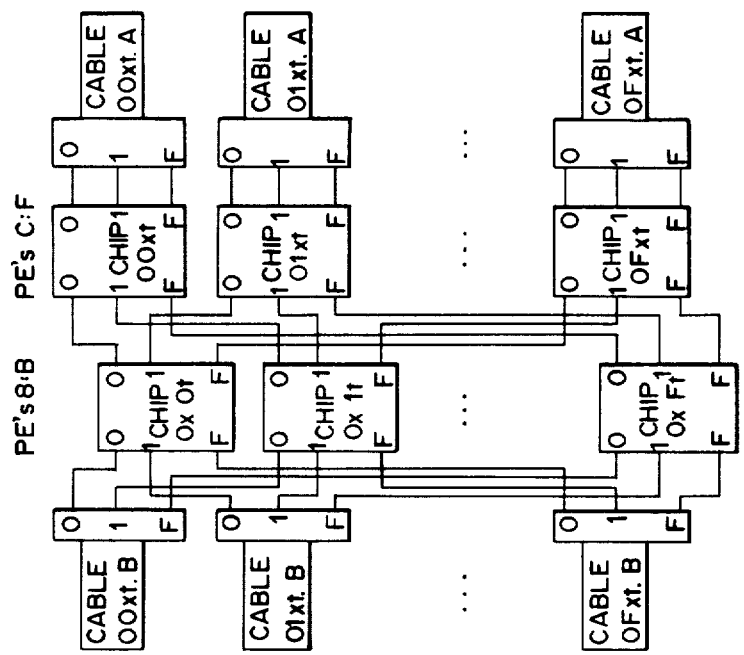
FIG. 12 illustrates a modification by interboard cabling whereby high-order board number is illustrated.

The FIGS. 11 and 12 present modifications of the inter-board cabling which can be used to build smaller networks.

The FIG. 11 illustrates low-order board number (t), holding PE's 0:7 of cycles 0t00:0tFF. One low-order board for each t, t=0, 1, . . . , F (for $2^{12}$-cycle system-size). All PE and cycle designations are hexadecimal. Cable 0txu.A contains the 16 wires which connect PE0 of cycles 0t0u, 0t1u, . . . 0tFu to its Predecessor, for u=0, 1, . . . , F.

The FIG. 12 illustrates a high order board number "t", holding PE's 8:F of cycles 000t, 001t, . . . 00Ft, 010T, 011T, . . . , 01Ft, . . . 0F0t, 0F1t, . . . 0FFt. One high-order board is provided for each t, t=0, 1, . . . , F. High and low order boards are identical, except for external connections to the control wires defining PE positions, and to the CCC cables. The lateral connectins between PE's at positions C:F of each cycle are not used. For systems smaller than $2^{12}$ cycles, fewer boards are used, and the cabling changes, but the boards remain identical internally.

OPERATIONS

The Boolean Vector machine designed according to the FIGS. 1 to 12 as discussed above presents 128 addressable registers, designated R(0) through R(127), plus two additional registers, A and B, used as generalized accumulators. Each of these registers is $2^n$ bits in length for some n up to 20. Addressable register R(0) has a special function, leaving registers R(1) through R(127) as general storage for Boolean (and numeric) data. Programs for the machine are stored in the memory of a conventional microcomputer as discussed above, which in principle controls the detail operation of the BVM by sending instructions, in parallel, to all chips comprising the BVM. In practice, a conventional microcomputer can possibly limit the BVM's speed to the rate at which the conventional machine can access instruction-words. Thus a conventional machine will send instructions to a fast, simple ROM controller as illustrated at FIG. 1 which contain the detailed orders implementing APL vector operations on numerical quantities stored in the BVM memory. The conventional microcomputer also controls I/O to and from the BVM.

In order to provide for a number representation the Ith bit position of register J will be denoted by R(j)$_i$, and R(j:k)$_i$ is an abbreviation for the vector of bits held in positions R(j)$_i$, R(j+1)$_i$ . . . , R(j+k)$_i$ of the BVM. Thus any vector R(j:k)$_i$ can hold a conventional binary integer whose value is $$V_i = \sum_{t=0}^{k} R[j + t]_i X 2^t.$$

A vector of k-bit integers $V_0$, . . . ,$V_2$ n can then be stored, one integer in each bit position of R[j:k]. One bit slice of the BVM is considered to be the entire collection R[0:127]$_i$, A$_i$, B$_i$. Each such bit slice i constitutes a microprocesor, capable of performing any required arithmetic or logical action on numbers held in various sequences R[j$_1$:k$_1$]$_i$, Rj$_2$:k$_2$]I, . . . , R[j$_q$:k$_q$]$_i$ of its registers. Each processor performs most arithmetic using simple, bit-serial algorithms. However, all processors may operate at the same time to perform $2^n$ such arithmetic operations in a truly parallel (not pipeline) fashion. It is possible to "disable" some processors, preventing them from changing registers R[1]$_i$ through R[127]$_i$. This feature can be used to simplify certain computations as will be discussed later.

The organization of the BVM is such that the processors should be viewed as an array of Single Instructions, Multiple Data stream computers, with a complex interconnection structure, a very simple instruction-set and limited memory. All processors obey a single instruction, emitted by the central controller, and apply the operation that instructions specifies to their own, privately accessible data. The instruction is complex enough to allow some processors to do nothing, conditioned on their positions with the array of the processors. A processor can also be prevented from modifying its local memory, based on a locally-set value in a special register of that memory, the "enable" register. The interconnection structure connects the processors into a cube Connected Cycles array, in which each processor has three neighbors. Data from any one of the processors neighbors can be used as one imput to its computation unit. The single instruction executable by each processor of the BVM performs two simultaneous assignments to 2 one-bit registers of processor i. The target of one assignment is register $B_i$; the other target is either $A_i$, or $R[j]_i$, where j is the "address" designated by the instruction. The values to be assigned are each Boolean functions (called f and g, respectively) of the same three Boolean variables $\bar{v}_i$; $v_i$ consists of $B_i$, plus any two of the set $A_i$, $R[j]_i$, $D_i$. The functions f and g are specifiable separately in the instruction, and may be any 0-1 valued function of 3 0 or 1 valued arguments. (In writing instructions, we allow f and g to be written as any C expression over $\bar{v}_i$ and constants which evaluates to 0 or 1 when each of the elements of $\bar{v}_i$ have values 0 or 1.]

The entire instruction performs no operation, unless the accompanying "enable predicate" (E(i)) is "true" for processor i.

The term "$D_i$" in the definition $\bar{v}_i$ allows interaction among different processors, by allowing one of the arguments to processor i's computation to be a one-bit value held by one of processor i's neighbors in the CCC network. Several optional ways of specifying $D_i$ are available:

(1) $D_i$ may be $R[j]_i$, so that f and g may compute strictly "local" functions of $A_i$, $B_i$, and $R[j]_i$.

(2) $D_i$ may be $A_{N(i)}$ or $R[j]_{N(i)}$, where N(i) designates one of i's neighbors in a flexible way. This option permits a bit from a distant memory cell to be sent to processor i, without modifying the values held in any processor's A or B registers.

Finally, N(i) may describe one of 3 neighboring processors of processor i in the CCC network. To describe these neighbors, we must specify the CCC network in more detail. This network consists of $2^Q$ cycles of processors, each Q processors in size; Q itself is a power of 2, $Q = 2^q$. A processor's number, i, is regarded as a two-component binary string $i = (c,p)$ where "p" is termed processor i's "position" in a cycle, and c is the number of that cycle. The number $i = c*Q + p$, for $p \in 0, \ldots Q-1$, $c \in 0, \ldots, 2^Q - 1$. Let us use the notation "$c_j$" to mean the value of the $j^{th}$ bit in c's binary representation, so that $$\sum_{p=0}^{Q-1} c_j 2^j = c.$$

Let the notation "$c \pm 2^j$" represent $c + 2^j$ if $c_j = 0$, and $c - 2^j$ if $c_j = 1$. The connections present in the CCC connect i to:

S(i) (i's "successor" around i's cycle),
P(i) (i's "predecessor" around i's cycle), and
L(i) (i's "lateral neighbor" in another cycle).
Numerically, if i is (c,p), these neighbors are:

$S((c,p)) = c, p+1 \mod Q)$, $P((c,p)) = (c, p-1 \mod Q)$, and $L((c,p)) = (c \pm 2^p, p)$.

That is, cycles whose numbers differ in exactly one bit-position, say position p, are connected, by a connection between their respective position-p processor. Finally, we can specify what values N(i) can take on in any one instruction:

N(i) may be S(i), P(i), or L(i), to denote, for all i, the corresponding neighbor of processor i; N(i) may be XS(i) or XP(i) to indicate that certain processors in the network use one neighbor, while others use a different neighbor. These notations allow pairs of processors around one cycle to address each other, and so exchange information in one instruction. Numerically, $$XS((c,p)) = \begin{cases} S((c,p)) & \text{if } p \text{ is even, and} \\ P((c,p)) & \text{if } p \text{ is odd.} \end{cases}$$

$$XP((c,p)) = \begin{cases} P((c,p)) & \text{if } p \text{ is even, and} \\ S((c,p)) & \text{if } p \text{ is odd.} \end{cases}$$

That is, if N(i) is designated as "XS" in a given instruction, processor-pair 2i and 2i+1 communicate in each cycle; if N(i) is "XP", then processor-pair 2i and 2i−1 communicate.

To handle communication with the world outside the BVM, some of the N(i) notations can be augmented with the notation "I", standing for input/output. In this case, the notation "IN(i)", as for example "IS", or "IP", specifies that most processors communicate with the same neighbor they would have in the absence of the "I" modifier. However, the connection between processors 0 and Q−1 in certain cycles are broken; processor 0's predecessor, and processor Q−1's successor become a one-bit register external to the BVM, so that bits shifted to this register are received by an external (output) device, while bits shifted from this register are taken from an input device. Each BVM configuration determines the cycles for which I/O action occurs; all configurations connect one I/O device to cycle 0, however. Cycle 0's I/O device is a register within the BVM controller. Numerically, let "I/O" be the set of cycle numbers of a given BVM with I/O connections, so that cycle $c \in I/O$ is connected to I/O register $W_c$. Then $$IS((c,p)) = \begin{cases} W_c \text{ if } p = Q - 1, \text{ and } c \epsilon I/O. \\ S(c,p), \text{ otherwise} \end{cases}$$

$IS(W_c) = (c,0)$ for all $c \epsilon I/O$ $$IP((c,p)) = \begin{cases} W_c \text{ if } p = 0 \text{ and } c \epsilon I/O \\ P((c,p)), \text{ otherwise.} \end{cases}$$

$IP(W_c) = (c,Q - 1)$ for all $c \epsilon I/O$.

The modifier I cannot be used with XS, XP or L. (The combination IXP would be meaningful, and would allow 2 bits to enter and leave each cycle $c \in 0$ I/O.

$$IXP((c,P)) = \begin{cases} W_{c,1} \text{ if } c\epsilon IO \text{ and } p = Q - 1 \\ W_{c,2} \text{ if } c\epsilon IO \text{ and } p = 0 \\ XP((c,p)) \text{ otherwise;} \end{cases}$$

$IXP(W_{c,1}) = (c,Q - 1)$, and
$IXP(W_{c,2}) = (c,0)$.

However, our implementation does not allow this.

Instruction Summary

Format:

$\{A_i \text{ or } R[j]_i\}, B_i \leftarrow f(b_i, D_i, F_i), g(B_i, D_i, F_i) \text{ if i mod } Q \epsilon$
E If $R[j]_i$ is an assignment target, the value held in $R[j]_i$ is modified only when $j=0$, or when $R[0]_i=1$. Otherwise, $R[j]_i$ remains unaltered. Here, $F_i$ may be $A_i$ or $R[j]_i$, and $D_i$ may be $A_{N(i)}$ or $R[j]_{N(i)}$. If i is (c,p), N(i) may be: 1: local $S(i)$: i's cycle successor $(c,p + 1 \text{ mod } Q)$
$P(i)$: i's predecessor $(c,p - 1 \text{ mod } Q)$
$L(i)$: i's lateral neighbor $(\pm 2^p, p)$
$XS(i)$: even successor exchange $(c,p \pm 2^o)$ $XP(i)$: even predecessor exchange: $\begin{cases} P(i) \text{ if } p \text{ even} \\ S(i) \text{ if } p \text{ odd} \end{cases}$ $IS(i)$: Successor $I/O$: $\begin{cases} W_c, \text{ if } c\epsilon IO \text{ and } p = Q - 1, \\ S(i) \text{ otherwise} \end{cases}$ $IS(W_c) = (c,Q - 1)$ if $c\epsilon I/O$
$IP(i)$: Predecessor $I/O$: $W_c$, if $c\epsilon I/O$ and $p = 0$
$IP(W_c) = (c,0)$ if $c\epsilon I/O$ $P(i)$ otherwise

Program Notation

In writing individual BVM instructions, we take certain notational liberties:

(1) We usually omit the "i" and "(i)" strings from instructions, and write "$X_y$" and "X.y".

(2) We usually write the "if clause" as "if E" where E is some designation of a subset of the integers $0, \ldots, Q-1$. This is an abbreviation for "if p $\epsilon$ E, where i is (c,p)".

(3) When E is the entire set $0, \ldots Q-1$, we omit the entire clause.

(4) When the source and target of one of the simultaneous assignments is the same, we omit that part of the statement.

(5) We allow f and g to be specified as any arithmetic expression, including function calls, involving the same three register or variable designators, so long as the values of these expressions are either 0 or 1, when the arguments have values of 0 or 1. The variable designators may be names of "vector" type variables, or "A" or "B" to designate the respective registers. A and B may not be used as variable names.

(6) The "vector" declaration:

Vectors allocated space in BVM memory may be declared as
vector <name>[<integer>],
as for example
vector X[3], Y[6], C[p];
This declares a vector, with one element per BVM processor. Each element is given <integer> bits of space to hold its representation. Specifically, the $j^{th}$ bit of the $i^{th}$ component of vector X is stored in $R[X_0+j]_i$, the $(X_o+j)^{th}$ register of processor i's memory. $X_0$ is computed by the compiler.

Using these rules, and assuming the declaration "vector X[16], Y[16];", we can abbreviate the instruction "$A_i, B_i \leftarrow R[X_0+1]_{XP(i)}, B_i$ if i mode $Q \epsilon 0,1, \ldots, Q-1$"
as:
"$A_i, B_i \leftarrow R[X_0+1]_{XP(i)}, B_i$ if $0,1, \ldots, Q-1$"
(using rule 2)
"A,B $\leftarrow R[X_0+1].XP, B$ if $0,1, \ldots, Q-1$"
(using rule 1)
"A,B $\leftarrow X[1].XP, B$ if $0,1, \ldots, Q-1$"
(using rule 6)

Most instructions will be written using rules, 1, 2, 5 and 6. In important special cases, further simplifications can be done. The instruction above will be written in this paper as:

"A$\leftarrow$X[1].XP"

using rules 3 and 4. The use of rules 3 and 4 is optional.

To designate f and g, note that considerable latitude is allowed. So long as each variable designator appearing in the expressions for f, g and as target of the assignment follows certain restrictions, and the expressions for f and g evaluate to 0 or 1, anything goes.

Restrictions:

(1) Each instruction can issue only one memory address. Hence, only one variable-designator may appear in any one instruction.

(2) Let M denote a variable-designator (memory address), and Y be a non-blank modifier. Then the expressions for f and g can be composed from any or all of:

(1) constants
(2) B
(3) one of A or M
(4) one of A.Y, M.Y or M

For this purpose, the expressions for f and g are not independent; if f's expression includes M.Y, then g's expression may not include A.Y.

For example, define:
int maj(x,y,z) int x,y,z;
   return (x+y+z$\geq$2);
int odd(x,y,z) int x,y,z;
   return ((x+y+z) % 2);
Then the following C-BVM program computes the APL vector operation $X \leftarrow X+Y$:

Program 1
vector X[p], Y[p];
B $\leftarrow$ 0;/*initial carry-in is zero*/
for (j=0; j<p; j++) {
   A $\leftarrow$ Y[j];
   X[j],B $\leftarrow$ odd(x[j],B,A,), maj (X[j],B,A);
   }
time: 2p+1 BVM operations As we define such AP1 operations, we will allow their appearance, as APL statements on vector operands. Such an appearance will be transformed by the compiler into an equivalent "true" BVM program.

In any true BVM program, various C statements appear, such as the loop in program 1 "for (j=0;j<p;j++)". Such statements are assumed to execute strictly in parallel with the BVM operations they generate. That is, the time needed for the execution of such loop-control constructs is assumed to be entirely overlapped with the time taken by the BVM to execute statements in the body of the loop. We assume a similar overlap in the case of conditional tests, such as "if(q) A←1 else A←0".

In this case, the BVM controller is expected to execute the conditional test of variable q (held in controller memory, not in BVM memory) during the time the BVM in executing its previous instruction.

So long as the BVM controller deals only with values held in controller memory, and these values are not computed by the BVM, such an overlap seems feasible. The controller must be delayed whenever its next instruction tests a value communicated to the controller by the BVM; such communication happens only when the BVM is commanded to perform an I/O operation, and may not delay the controller even then. We believe that careful design of the compiler and BVM controller will achieve a design which satisfies these assumptions.

Elementary Arithmetic

Vector arithmetic on the BVM is essentially programmed in a bit-serial fashion. For the most part, we will assume that integers are represented using 2's complement notation to p bits of precision. The following variations of Program 1 seen clear:

```
Program 2: APL operation X ← X + Y:
A,B ← Y[0],0; /*Note that "0" is a valid form for f
to take*/
   for (j=0; j<p−1;) {
      X[j],B ← odd(X[j],A,B), maj(X[j],A,B);
      j++;
      A ← Y[j];
   }
X[j],B ← odd(X[j],A,B), maj(X[j],A,B);
Time: 2p BVM operations
```

Program 2 demonstrates that careful "unwinding" of the loop of program 1 can save one instruction; we neglect such fine points in later programs, for the sake of simplicity, but state the time in BWM operations as if such optimization has been carried out.

```
Program 3: APL operation X ← X − Y:
B ← 1;/*initial carry-in is 1*/
for (j=0; j<p;j++) {
   A ← 1−Y[j]; /*f(x = 1−x is legal*/
   X[j],B ← odd(x[j],A,B), maj(x[j],A,B);
}
```

Program 3 computes the 2's complement of $Y_j$, by adding the one's complement of $Y_j$ to an initial carry-in of 1.

Program 4

Suppose q is a binary integer stored in the BVM controller, so that its bits $q_i$ are readily testable. Thus $$q = \sum_{i=0}^{p} q_i 2^i, q_i \epsilon 0,1.$$

Then the APL operation

X←X+q*R[j]

(where R[j] is the $j^{th}$ register of BVM memory) can be computed as:

```
B ← 0;
for (i=0, i<p; i++) {
```

-continued
```
   if (q_i=1) A ← R[j] else A ← 0;
   X[i],B ← odd(X[i],A,B), maj(X[i],A,B);
};
```

Program 4 makes use of the fact that the value stored in a single BVM register is either 0 or 1. Then the arithmetic product $$q*R[j] = \Sigma(R[j]*q_i)2^i, \text{ and}$$

$$R[j]*q_i = (\text{if } q_i=1 \text{ then } R[j] \text{ else } 0),$$

since R[j] and $q_i$ are elements of {0,1}.

Program 5

Integer vector multiplication: APL is T←X*Y. The best method seems to be the addition of $$X[i]*Y*2^iT, \text{ for } i=0, \ldots, p-2,$$

followed by the subtraction of $$X(p-1)*Y*2^{p-1} \text{ from T}.$$

(to justify this, we note that a number q in 2's complement notation has value $$q = \sum_{i=0}^{p-2} q_i 2^i - q_{p-1} 2^{p-1}.)$$

We will accomplish these conditional additions by using the "activate register", R[0], to prevent any changes to processor memory cells in processors i such that $R[0]_i = 0$.

```
A ← 0;
for (j=0; j<p+p; j++)
   T[j] ← 0;
for (i=0; i<p−1; i++) {
   A ← X[i];
   R[0],B ← A,0;
   for (j=0; j<p; j++) {
      A ← Y[j];
      T[i+j],B ← odd(T[i+j],A,B,), maj(T[i+j],A,B);
   }
}
A ← X[p];
R[0],B ← A,1;
for (j=0; j<p; j++) {
   A ← Y[j];
   T[p=1+j],B ← odd(*T[p−1+j],A,B), maj(T[p−1+j],A,B);
};
```

Notation for the program above can be shortened, if the compiler recognizes the notation T[i]←T[i]+Y to mean Program 1, with the expression "T[i]" substituted for X everywhere, and the resulting notation "T[i][j]" to mean T[i+j]:

Let T[i]←T[i]+Y be:

```
B ← 0;
for (j=0; j<p; j++) {
   A ← Y[j];
   T[i+j],B ← odd(T[i+j],A,B), maj(T[i+j],A,B);
};
``` and similarly for T[i]←T[i]−Y. Program 5 becomes program 6, below:

| | |
|---|---|
| Program 6: | APL is T ← X * Y |
| | for (j=0); j<p+p; j++) |
| 2p | T[j] ← 0; |
| | for (i=0; i<p−1; i++) { |
| p−1 | A ← X[i]; |
| p−1 | R[0] ← A; |
| 2(p−1)*p | T[i] ← T[i]+Y; /*conditional on R[0]=1*/ |
| | } |
| 1 | A ← X[p−1]; |
| 1 | R[0] ← A; |
| 2p | T[p−1] ← T[p−1]−Y; /*conditional on R[0]=1*/ |
| 1 | R[0] ← 1; /*f(x)=1 is legal*/ |
| Time: $2p^2 + 4p + 1$ | |

Program 7

Floating point vector addition.
APL: Z←X+Y (float__).

Representation: A flating point number X will be represented as a pair of 2's complement integers X1 and X2 such that the value of X is $X1*2^{X2}$, where X1−0, or $2^{p-2} \leq |X1| < 2^{p-1}$. Suppose X1 is represented to e bits of precision, and X2 to p bits of precision, where $p=2^q$.

Method:

(1) Place whichever of X and Y has the smaller exponent in Z, and the other number in temporary U. Compute T=U2−Z2, so that T gives the (positive) difference in exponents.

(2) The "mantissa" Z1, of Z must now be shifted right T bit positions. Z2 may then be set equal to U2.

(3) We can then compute Z1←Z1+U1.

(4) The sum must now be shifted left until $$Z1[p-1] \neq Z1[p-2],$$

thus normalizing Z1 to satisfy $2^{p-2} \leq |Z1| < 2^{p-1}$. For each bit position shifted in this process, Z2 must be decreased by 1.

The key problem in this process is the shifting operations, since each shift step requires some 2p BVM operations, and some p shift steps of one bit position each would be needed, if a straightforward method were used. This would total $4p^2$ BVM operations, just for the possibility-needed shifting operations. (Note that, because this operation is a vector floating point addition, enogh shift operations must be provided to allow for the maximum possible exponent-difference. All of these operations must be executed, although certain processors may not obey some of these operations.)

Instead, we can use "conditional assignment" as in the "multiply" program (program 6), to shift Z1$_i$ right T$_i$I. places, as follows:

| | |
|---|---|
| Program 8: | Shift Z1 right T places: |
| APL is Z1 ← Z1 >> T. | |
| | for (j=0; j<q; j++) { |
| 2q | R[0] ← T[j]; |
| | for (t−0; t<p−$2^j$; t++) |
| 2q(p−$2^j$) | Z1[t] ← Z1[t+$2^j$]; |
| | for (t=p−$2^j$; t<p; t++) |
| 2q$2^j$ | Z1[t] ← Z1[p−1]; |
| }; | |
| Time: 2qP + 2q, where P = $2^p$ | |

In effect, the $j^{th}$ step of the outer loop shifts Z1$_i$ right T[j]$_i$*$2^j$ positions. After the entire loop completes execution, Z1 will be shifted right a total of $$\sum_{j=0}^{q-1} T[j]_i * 2^j = T_i$$

positions. We denote this operation by "Z1←Z1>>T", using a mixture of APL and C notation.

| | |
|---|---|
| Program 7, continued: Floating-point vector addition. |
| | /* X = X1 * $2^{X2}$ */ |
| 3e | T ← X2 − Y2; /*Calculate exponent differences */ |
| | /*Assuming X2≧Y2, place number with smaller exponent in Z, larger in U*/ |
| 4p+2e | Z1 ← Y1; U1 ← X1; U2 ← X2; |
| 2 | R[0] ← T[e-1]; / *Enable stores if T<0*/ |
| | /*Execute the following if X2 < Y2*/ |
| 2p+3e | Z1 ← X1; U1 ← Y1; U2 ← Y2; T ← T; |
| 2qp+2q | Z1 ← Z1>>T; /*The ∓>>" program sets R[0]*/ |
| 1 | R[0] ← 1; |
| 2p | Z1 ← Z1 + U1; |
| 2e | Z2 ← U2; /*Z's exponent is now the same as U's*/ |
| 2qp+3q+e | T ← Norm(Z1); /*set T to the number of leading zeros in Z1's magnitude, and shift Z1 left that number of places*/ |
| 1 | R[0] ← 1; /*Enables all processors for store*/ |
| 2e | Z2 ← Z2-T; /*Change exponents appropriately*/ |

Time: $4qp+8p−13e+5q+4$, where $p = 2^q$. For q=4, e=8, this gives p=16, Time: 512 operations, or some 10½ addition times, at 2(p+e) operations per addition. As a formula, we get approximately $2(q-1)p/(p+3)30$ 7 add-times.

Program 9

Postnormalize Z1. Shift Z1$_i$ left until the leading bit of its magnitude equals 1. Put the number of places shifted into T$_i$. APL: T←NORM(Z1).

Method: For decreasing values of j, we determine if |Z1$_i$| has $2^j$ leading zero bits. If so, we set T[j]$_i$ to 1, and shift Z1$_i$ left $2^j$ places. Otherwise, we simply set T[j]$_i$ to 0.

To determine if Z1's magnitude has k leading zeros, we simulate a finite automation which starts in state 1, and goes to state 0 when it first encounters a leading bit of Z1 which does not equal the sign of Z1. Register A holds the state, and register B holds the sign of Z1 during the scan.

| | |
|---|---|
| | /* T ← NORM(Z1) */ |
| e | T ← 0; /*Set all bits of T to zero*/ |
| | for (i=q−1; i≧0; i--){ |
| | /*Does abs(Z1) have ≧$2^i$ leading zeros?*/ |
| q | A,B ← 1, Z1[p−1]; |
| | for (j=p−2; j>p−$2^i$−2; j--) |
| y | A ← A & (B ≠ Z1[j]); |
| q | T[i] ← A; /*Record a 1 if yes*/ |
| q | R[0] ←A; /*Enable storing if yes*/ |
| | /*Conditionally shift Z1 left $2^i$ places*/ |
| | for (j=p−2; j≧$2^i$; j--) |
| 2q*p−2x | Z[j] ← Z[j−$2^i$]; |
| | for (j=$2^i$−1; j≧0; j--) |
| x | Z[j] ← 0; |
| | }; |

Timing: During the iteration of the outer loop in which variable i has value i, the contribution to y is $2^i$ instructions, and that to x is also $2^i$ instructions. Hence x=y, and Time: 2qp+3q+e.

Program 10

Cycle ID generation

Several algorithms, including the Fast Fourier Transorm algorithm and cetain pre-specified permutation programs (such as Bit Reversal Permutation), require that each processor know whether it is at the "0" or the "1" end of its Lateral communication link. If every processor in the network is given such an identifying one-bit constant, each cycle is then in effect numbered, with the i-th bit of cycle c's number held by processor (c.i), the processor at position i in cycle c. The following program uses the CCC, and one I/O connection to cycle 0, to compute all cycle ED numbers in $4Q-1$ BVM operations, for cycles of length Q.

Method:

1. [Initialize] Set all A registers to 1; then use the I/O connection to cycle 0 to introduce "0" into processor (0,0)'s A register.

2. [Form strings of 0's] The string $S_p$ of bits held by processors numberes (c,p) for all c is set for $0^{2p}$, for $p=0,\ldots,Q-1$.

3. [Rotate O1] Copy $S_p$-$S_{p-1}$. This sets $S_p$ to $0^{2p-1}1^{2p-1}$

4. [Duplicate all strings] $S_p$ becomes $S_{p-1}S_{p-1}0^{2p-2}1^{2p-2}0^{2p-2}1^{2p-2}$.

5. [Repeat] Step 4 is repeated $A-1$ times, leaving $S_p=(0^{2p}1^{2p})^{2Q-p-1}$

---

Cycle ID program:

```
/* Initialize Sp to 01^(2Q-1) */
A -- 1;
A,B ← A.IP,A.1P: /*; with controller's cycle-0
output
register set to 0. In effect, this
sets A.(0,0)=0 leaving all other A-
register values unchanged, and sets
B.i so that B.i = = A.i
*/
/* form strings of 0's. */
for (j=1; j<Q; j++) { /* Si=0^(2^i) for i=0, . . .,j-1 is INVj */
  A -- A.L&A: /* Sj= 0^(2^j-1) and INVj */
  A -- A.P & B ,
  /* Sj= 0^(2j) and INVj. This is
  INV(j+1). */
};
/* Rotate 1 */
A← A.P; /* Sp= 0^(2p-1) 1^(2p-1) for p>0;
S0= 0^(2Q-1) 1^(2Q-1) */
/* Repeatedly concatenate Sp with itself, for p>j. */
for (j=o; j<Q-1; j++) { /*Sp= (0^(2p-j-1) 1^(2p-j-1))^(2j) for
P>j. and
Sp= (0^(2Q-j-1+p) 1^(2Q-j-1+p))^(2j-p) for p≥j */
A -- A & A.L; /* This has no effect on p for p<j.
For P>j, Sp becomes SpSp */
/* See example. */
A -- A.P;
};
```

Example

Cycle ID program for $2^4$ cycles of length $Q=4$

| After initialization: (cycle numbers in hexadecimal) | |
|---|---|
| 0123456789ABCDEF | |
| p | |
| 0 0 | |
| 1 | |
| 2 all 1's | |
| 3 | |
| After j=1. and | |
| A ←A.L&A ; | A ← A.P&B ; |
| 0123456789ABCDEF | 0123456789ABCDEF |

| After initialization: (cycle numbers in hexadecimal) | |
|---|---|
| p | |
| 0 0 | 0 |
| 1 | 00 |
| 2 | |
| 3 | |
| j=2 | |
| 0123456789ABCDEF | 0123456789ABCDEF |
| p | |
| 0 00 | 0 |
| 1 0000 | 00 |
| 2 | 0000 |
| 3 | |
| j=3 | |
| 0123456789ABCDEF | 0123456789ABCDEF |
| p | |
| 0 00 | 0 |
| 1 0000 | 00 |
| 2 00000000 | 0000 |
| 3 | 00000000 |
| After Rotate 1: | |
| 0123456789ABCDEF | |
| p | |
| 0 0000000011111111 | |
| 1 01 | |
| 2 0011 | |
| 3 00001111 | |
| After j=o, and | |
| A ← A & A.L; | A ← A.P; |
| 0123456789ABCDEF | 0123456789ABCDEF |
| p | |
| 0 0000000011111111 | 0000111100001111 |
| 1 0101 | 0000000011111111 |
| 2 00110011 | 0101 |
| 3 0000111100001111 | 00110011 |
| j=1: | |
| 0123456789ABCDEF | 0123456789ABCDEF |
| p | |
| 0 0000111100001111 | 0011001100110011 |
| 1 0000000011111111 | 0000111100001111 |
| 2 01010101 | 0000000011111111 |
| 3 0011001100110011 | 01010101 |
| j=2: | |
| 0123456789ABCDEF | 0123456789ABCDEF |
| p | |
| 0 0011001100110011 | 0101010101010101 |
| 1 0000111100001111 | 0011001100110011 |
| 2 0000000011111111 | 0000111100001111 |
| 3 0101010101010101 | 0000000011111111 |

Program 11

X.0←max(X)

This program sets element 0 of vector X equal to the value of the maximum element in the original vector. Several other elements of X are also changed in the process. The program uses program 12, which computes.

```
            X.i ← max (X.1, X.N(i)),
            for any "neighboring" processor N(.).
            for (j=1; j<=1; J++){
2Qp+Q       X ← max (X, X.P) if j−1 ;
            };
            /* Now, X.P (c,0) = = max x.(c.k) |0 <=k<Q . */
            for (j=1; j<==Q; j++){
            /* Iteration j sets
            X. (i2^j, j%Q = max x. (i2^j+t, k) | 0≤2^j and
            0≤k<Q, for 0≤i2^(j+1)<2Q. */
2Qp+Q       X ← max (X, X.L) if j−1 ;
Qp          X ← X.P if j%Q ;
            };
```

Timing: $5Qp+2Q$

Program 12

X←max (X, X.N)

This program is straightforward. N may be any neighbor designator. As written, X holds unsigned integers. However, variations of the program to handle 2's complement arithmetic, minimization, and oriented comparison-exchange take little more time.

```
/* Set A ← (X < X.N). */
A ← 0;
for (j=p−1; j >=0; j--){
  A ← ( X[j] < X (j).N) | A ; };
/* If A.i == 1, set X.i ← X.N(i)/ */
for (j=0; j<p; j++){
X[j] ← if A then X[j].N elst X[j];}
```

Timing 2p + 1 BVM operations

Program 13

0-1 Integer Linear Programming Problems

Suppose $X_i$ are 0-1 valued variables, for i=0, . . . ,n. and we wish to compute:

$$\max \Sigma\ C_i X_i \text{ subject to}$$

$$\sum_1 D_{ij} X_i < E_j, j = 1, \ldots, m.$$

If $2^n$ = length of a BVM register, we can proceed to generate a vector whose $U^{th}$ position represents that assignment of values to the $X_i$ so the $U = \Sigma X_i 2^i$. For this purpose, we represent $X_i$ by X[i], i=0, . . . ,n. We will first use program 14 to compute X such that $$U = \sum_{j=0}^{n} X[j]*2^j,$$

for $0 \leq U < 2^n$.

|   | |
|---|---|
|   | vector V.(p), F.(1); |
| 1 | F ← 1; /* Initially, all assignments are feasible. */ |
|   | for (j−1; j <=m; j++){ |
| pm | V ← 0; |
|   | for (i-0; i<=n; i++) |
| 2pmn | V ← V + $D_{ij}$*X[i]; |
| m+2pm | F ← F & (V <= $E_j$); |
|   | /* F.i becomes 0 unless contraint j is satisfied. */ |
|   | }; |
| p | V ← 0; |
| 2 | R[0]← F; /* Prevent changes to V.i unless F.i==1. */ |
|   | for (i=0; i<n; i++) |
| 2pn | V < $C_i$*X[i]; |
| 1 | R[0]← 1; /* Allow changes to all V.i */ |
| 5Qp+2Q | V.0 ←max (V); |
| p | output (V); |

Timing: 2pmn+p* (3m+2m+5Q+2)+2Q+4. At Q=n=16, the communication cost (5Qp+p+2Q) is outwayed by the computation cost when m<1.

Program 14

Computing $$X[i] \cdot u = \sum_{i=0}^{n} X[i] \cdot u*2^i.$$

We assume A has been set to the cycle-ID constant (program 10).

```
Let BIT(i) = p | (p/i%2 = 1 .
for (j=0; j<Q; j++) {
  X[j] ← A;
  A ← A.S;};
  /* Processor p of cycle c now holds bit C_j in X[j−p]%Q]*/
  for (i−1; i<Q; i *=2)
    for (t=0; j<1; t++) {
      B ← X[t] if BIT(i);
      for (j=t+i−; J<Q j += i)
      X[j], B ← B, X[j] if BIT(i);
      X[t] ← B if BIT(i);
    };
```

/* The code above rotates X.(c,p) left p bits, using amethod similar to that used to shift Z1 left T places. */

If the following assumptions are made with regard to a conventional computer, it is possible to compare the performance of the architecture of the BVM design with a conventional computer. Namely, these assumptions are chosen to favor the conventional machine where possible for purposes of illustrating the points.

(1) Assuming a hypothetical conventional machine, M capable of executing A←A op Mem(j) are numbers of precision p in one memory cycle, where "op" is any arithmetic operation in the set [+, −, x, /].

(2) Assuming M has a memory of size $2^n$ words, each p bits in length.

(3) Assuming the implementation of an "equal" sized BVM using the same memory technology so that memory cycle times are the same.

(4) Assuming an implementation of the BVM with 4 numbers per BVM PE.

With these assumptions, a BVM labeled B may be hypothesized of equal size to M; B having $2^n/4$ PE's each with 4 p bits of local memory. We compare the time $t_M(A,N,p)$ needed by M executing some "fastest known" algorithm A for problem P, with the time $T_B(B,N,p)$ needed by B to solve problem P, on a problem instance size N chosen to minimize $T_B(P,N,p)$. The ratio $T_M(A,N,p)/T_B(P,N,p)$ is called the "speed-up factor" of B, for algorithm A. It is to be noted that the algorithm which B uses to solve P may differ somewhat from that used by M. However, both machines are expected to perform essentially the same calculations when those calculations are expressed as recursion equations, or as data flow graphs.

As a particular example of this, the fast Fourier Transform problem is considered. Let M and B both execute the algorithms' whose recursion equations are expressed as $F_{i+2j} \leftarrow F_i - aF_{i+2j}$, $F_i + aF_{i+2j}$. In this instance, a is the power of $\omega$, a complex primitive route of unity. Under these assumptions, assuming the needed powers of $\omega$ are pre-calculated, M can execute this algorithm on a problem instance of $2^n/4$ complex numbers, each represented as a pair of numbers with precision p (half of M's memory is devoted to storing the needed powers of $\omega$). This calculation requires some six operand references per "step" and $n2^n$ steps, so that M needs $O(n-2)$ $2^n/4$ memory references (ignoring references to the indices and references needed to store results).

In contrast, B performs the needed multiplications using bit-serial arithmetic, but on all PE's simultaneously. B must also perform local calculations, to produce the needed powers of $\omega$. However, the resulting algorithm adds only six real multiplications to the four needed by M. Furthermore, at each step, a pair of PE's can participate together, each performing half of the work B requires some $6p^2+6p$ memory accesses per "basic step". B must execute $n-2$ of these basic steps. In addition, use of the CCC to transmit data requires $4(n-2)$ memory accesses per bit of data accessed during the basic stop of one PE. There are 4p such bits, so that the total time needed by the BVM becomes $(n-2)(6p^2+8p)+4(n-2)(4p)$ or $6(n-2)p(p+4)$. Thus the reported speed-up factor is $2^n/4p(p+4)$ for this algorithm.

With regard to yet another application area, the use of a moderate-size BVM (approximately $2^{16}$ PE) is considered to simulate digital logic circuits at the gate level. Gate level simulation of large circuits seems useful to ensure that the "complete" design has no flaws due to misplaced global wiring, or to interactions between cells which are distant in the logic, but are implemented as neighbors electrically, or geometrically. Such simulation is slow on conventional machines requiring roughly one machine operation per connection between a wire and an active device just to simulate a possible change of state. Now, considering a simulation of a circuit with some $2^{10}$ wires, using "gate" logic rather than MOS pass transistors. Supposing that the circuit is designed using one 2-input gate type throughout.

Each wire and its (assumed-unique) driving gate is represented in one of the BVM PE's. The circuit simulation algorithm proceeds as follows:

Obtain FIRST input. This step comprises a combined permutation-and-broadcast operation in which $PE_i$ obtains the state of the wire connected to input 1 of the gate which drives i's wires for all i at once; this is a predetermined permutation after duplicating certain wire states, which can be performed by the BVM in some $8\times16$ operations.

Obtain SECOND input. The method is similar to Step (1) but is applied to the same input to i's gate, for all i.

Compute new wire state. A single Boolean operation for all wires simultaneously, which can actually be performed during the last BVM operation of step (2).

The equivalent computation on a conventional machine requires $3\times2^{18}$ memory accesses; on the BVM, a total of $16\times16$ memory accesses are used. Thus, the speed-up of $3\times2^8=768$ can be predicted. Indeed, a circuit of $2^k$ gates can be simulated in time of roughly 16k, on a sufficiently large BVM; the same computations would require time $3\times2^k$ on a conventional machine, yielding a speed-up factor of $(3/18)\times2^k/k$. Similar gains are possible for MOSSIM type simulators as disclosed in "An Algorithm for MOS Logic Simulation" by Bryant, Lambda, 4th quarter, 1980, pp. 46-53, although the multiplicative constant in the above formula may be smaller. It is nonetheless indicated that the simulation of such large logic circuits on a programmable machine such as the BVM, at such speeds is quite an important feature.

With regard to the input/output port schemes discussed in conjunction with FIG. 2 and the accompanying input/output shift patterns of FIG. 13 from an operational point of view, the architecture scheme provides each logical board with an ability to accept data from its own I/O device. Devices such as disk drives, which may not operate in a phase/lock fashion can be accommodated by using the I/O controller on each board to deactivate all PE's on its logic board, until the proper sequence of words is available. A program to perform I/O of one word of data appears below. It would iterated once for each word transferred. This number equals the number of PE's chained together by the I/O shift pattern programmed by two constant vectors VC and SC.

```
For (j=0;j<p;j++) {
R[j], B ← R[j].JP, R[j]:
/.B ← local R[j] value, and local R[j] ← Predecessor
R[j] simultaneously. Same result as if commands
were done in this sequence. The I/O port is
enabled during this instruction, allowing an
input bit to enter one PE on the board instead
of a bit from that PE''s Predecessor./
A, B ← B, PC;
/.A ← original local R[j] value (from B register), and
B ← PC. PC has value 1 for any PE which is
programmed to listen to its Predecessor PE
during the I/O shift pattern, and has value 0
otherwise. /
R[j] ← B ? R[j]:A.S;
/ If PC==0, set local R[j] from the A register of the
Successor PE. (The A register of each PE holds
the one-bit value originally stored in R[j] of
that PE.) Otherwise, leave local R[j]
unchanged. (The function B ? R[j] : A.P, which
has value R[j] is B holds a 1, and value A.P
otherwise, is a Boolean-valued function of 3
Boolean arguments, and can be specified by an
appropriate choice of truth table for f().)/
B ← LC;
/.LS ic a constant, with value 1 for all PE's
programmed to listen to their lateral neighbors
during an I/O shift pattern/
R[j]← B ? A.L : R[j];
/ If LC==1, local R[j] is replaced with the constants
of lateral neighbor's A register (the original R[j]
value held by that neighbor). Otherwise, local R[j] is
unchanged./
}
```

Analysis of the operation of this program shows that the PE's of class "X" in the table below execute the adjacent instructions, on one pass of the loop. Here, X may be L, S, or P, to indicate which neighbor a given PE listens to during an I/O shift:

| instruction: | PE classes executing it: |
| --- | --- |
| A ← R[j]; | L, S and P (all PE's) |
| R[j] ← A.P; | L, S and P (all) |
| R[j] ← A.S; | L and S |
| R[j] ← A.L; | L |

Thus PE's of class L are left with R[j].L (their lateral neighbor's original R[j]value) in their own R[j] cell; PE's of class S are left with R[j].S, and PE's of class P are left with R[j].P.

Obviously, numerous additional modifications and variations of the present invention are possible in light of the above teachings. In one particular variation, one bit sent from each of 3 neighboring processing elements in the CCC is available at each processing element. These 3 bits may have come from the addressed memory cell of each neighbor, or from either the A or the B registers of each neighbor. Also available at each processing element are 3 additional bits of data, held in the addressed memory cell, the A, or the B registers of this processing element. Any 3 of the 6 available bits can be used as inputs to the Boolean function generator circuits. (One version of the switching circuitry 2c which allows only one of the neighboring processing elements to contribute a bit at one time; furthermore, that bit cannot come from the neighbor's B register. Also, this version requires that the inputs to both logic circuits be the same. These design restrictions could all be relaxed.) The two bits of output produced by the Boolean function generators can be selectively routed to any of 3 possible destinations, so long as both bits are not routed to the same destination:

(a) this processing element's A register;
(b) this processing element's B register; or
(c) back into the addressed memory cell of this processing element.

(In one design, the B register must be used as the only destination for one of the two bits; the other bit may be sent to either the A register or the addressed memory cell, but not both. Other designs are possible, including designs which route either bit to more than one destination among the three listed.)

A particular variation of the control of the CCC takes advantage of the fact that each of the processing elements around one cycle of the CCC network is given a "position number". Then all processing elements with the same position number, in different cycles of the CCC, are controlled together. Each such set of processing elements receives a distinct activation control bit 1b4, that same bit being sent to all processing elements in one set. The value of this bit received by any processing element determines whether that processing element obeys, or does not obey, any given instruction broadcast to all processing elements. The control of each set of processing elements is thus independent of which other sets of processing elements are obeying any particular instructions.

A scheme for dividing the CCC network among chips (or boards) is such that many processing elements (PE's) appear on each chip (or board) but few pins are needed for connections between chips, is unique. In fact, two schemes have been devised which may be chosen based on the ability of available VLSI processing technology to put certain numbers of PE's on one chip (or board), and based on the number of wires which can leave chips (or boards). Both schemes allow the entire CCC network to build out of identical chips (or boards) each containing at least 8 PE's.

The CCC network consists of $Q * 2^Q$ processing elements, arranged in $2^Q$ cycles of Q PE's each. Each PE X is numbered by a pair $(X_c, X_p)$ where $X_c$ is the cycle number to which PE X belongs, and $X_p$ is X's "position number" within its cycle. Connections are provided between PE (c,p) and PE's numbered:

(C,(p+1) mod Q), (C,(p−1) mod Q), and (D,p) such that $Q_p \neq C_p$, when $C_p$ is the pth bit of the binary representation of C. These PE's are called, respectively, X's Successor, Predecessor and Lateral neighbors.

Scheme 1

To build a CCC network of $2^Q$ cycles, each containing Q processing elements, choose t to divide Q evenly. Then, place processing element (C, i) on chip $(C_1 + C_2 * 2^{jt}, j)$, where: $jt \leq i < jt + t$ defines the integer j, $C_1 = C \bmod 2^{jt+t}$, and $C_2 = (C - C_1)/2^{jt+t}$.

Two PE's which are joined by a connection of the CCC, and appear on the same chip by the above rule are connected together on that chip; other PE's are connected together by using external pins. In schele 1, 2 * $2^t$ external pins are needed, two for each cycle C, to connect PE (C,jt) to its Predecessor neighbor, and PE numbered (C,jt+t−1) to its Successor neighbor.

Each chip holds t * $2^t$ PE's, and all chips have identical interconnection topologies. No off-chip lateral interconnections exists.

Scheme 2

As in the scheme 1, but place $t2^{t-1}$ processors on each chip by the rule: PE numbered (C,i) is placed on chip $(C_1 + C_2 * 2^{jt+t}, j)$, where $jt \leq i < jt + t$, and $C_1 = C \bmod 2^{jt+t-1}$ $C_2 = (C - C_1)/2^{jt+t-1}$.

In shceme 2, the lateral neighbor of processing element numbered (C, jt+t−1) does not appear on the same chip as does processing element (C,jt+t−1). For example, if C=0, j=0, t=4, PE numbered (0,3) appears on chip (0,0). The lateral neighbor of PE (0,3) is PE number (8,3) which appears on chip $(0+1 * 2^4, 0) = (16, 0)$. A special circuit allows 3 pins per cycle to achieve bidirectional lateral intercommunication, as well as uni-directional successor and predecessor intercommunication between PE's on different chips in this scheme.

Input-output to the processor for the above CCC division is accomplished by interposing "switching elements" on connections between processors (C,Q) and (C,0) of certain cycles C. Any bit-serial I/O device can be connected to each such port, such that, under controller command, bits boming from the device are sent to PE (C,0) as if they came from that PE's predecessor neighbor in the CCC; alternately, bits can be sent to PE (C,0) from the device as if they came from PE(C,Q)'s successor neighbor. Under controller command, any such device can be made to accept bits coming from the PE's; under non-I/O commands, PE's(C,O) and (C,O) are connected together by the "switching element" of cycle C, and the I/O device is disconnected. [The above comes directly from the CCC paper, except for the emphasis on bit-serial I/O devices.] Any number $2^X$ of such I/O devices, where $0 \leq X \leq Q$ can be connected to the machine network. If $2^X$ such I/O devices are so connected, the J-th such device is connected to cycle T*J, for $T = 2^Q/2^X$, and $J = 0, \ldots, 2^X - 1$. Then all of these devices can be controlled, to simultaneously stream bits through cycles of the CCC. Bits coming from device J are streamed in a Hamiltonian path through cycle JT, JT+1, ..., JT+T−1 of the CCC. One bit from each device may be accepted, or read out of, the BVM on every BVM operation, if the I/O shift pattern is "wired in" to each BVM as it is one preferred implementation. Furthermore, the BVM can easily organize the stream of bits coming from a given device into words, z bits each, stored one word per PE of the BVM. Thus, a very high I/O data-rate can be sustained. Since in the packaging schemes 1 and 2, the CCC connection between these particular processors is "off-chip", conventional circuits can be built, one per I/O device, to perform the needed switching. These circuits control wires of the CCC which are accessible outside the chips which package PE's as described in claim 2. A given collection of $2^X$ such I/O devices can be controlled so as to act like a collection of $2^Y$ devices, for any $Y<X$, as well.

It is therefore to be understood that within the scope of the appended claims, the invention may be practiced otherwise than as specifically described herein.

What is claimed as new and desired to be secured by Letters Patent of the United States is:

1. A single instruction multiple data processor comprising:
   a plurality of processing elements, interconnected in a Cube Connected Cycle Network design and using interprocessor communication links which carry one bit at a time in both directions simultaneously;
   controller means for controlling each of said plurality of processor elements which feeds each of said processor elements identical local memory addresses, identical switching control bits, identical Boolean function selection codes, and distinct activation control bits, depending on each of said processor's position in said Cube Connected Cycles Network in a prescribed fashion; and
   a plurality of input/output devices connected to said network by a plurality of switching devices wherein,
   each of said plurality of processing elements comprises:
   two single-bit accumulator registers (A, B);
   two Boolean function generator units, each of which computes any one of $2^8$ possible Boolean functions of three Boolean variables as specified by Boolean function codes sent 2 at a time by said controller to each of said processing elements;
   switching circuit means controlled by said controller which select the three inputs to the logic function generators and to which switching circuitry provides that the output of one of said generators is fed to a first one of said registers (B) and the output of the other generator is fed to a second one of said registers (A) and an addressed memory cell of a local memory wherein said local memory consists of at least k bits and at most p bits where p is chosen to be appropriate to VLSI technology so that the space on a VLSI chip required by an entire processing element is at least one-half devoted to the processing elements's memory.

2. A single instruction multiple data processor according to claim 1, wherein a multiple of 32 of said plurality of processing elements are placed on one VLSI chip in such a way that all processing elements on one chip use the same address decoding circuits.

3. A single instruction muliple data processor according to claim 1, wherein one of the addressable bits of said memory inhibits the changing of information in the remainder of said memory when said addressable bit is in a predetermined one of its states.

4. A single instruction multiple data processor according to claim 1, wherein each processing element holds single bits and wherein said processing element is designed so that in one memory cycle the value of the contents of the addressed cell can be read out and routed through the Boolean function circuitry so that the result of said combination can be routed in order to replace the contents of the addressed cell of said processing element of said memory.

5. A single instruction multiple data processor according to claim 1, wherein each of said processing elements has a position number with those of said plurality of processing elements having the same position number being controlled simultaneously in response to a distinct activation control bit which is sent to each of said processing elements whereby the value of said distinct activation control bit determines which said processing elements respond to instructions given to all said processing elements so that the control of those processing elements having the same position number is independent of others of said processing elements having different position numbers.

6. A single instruction multiple data processor comprising:
   a plurality of processing elements, interconnected in a Cube Connected Cycle Network design and using interprocessor communication links which carry one bit at a time in both directions simultaneously;
   controller means for controlling each of said plurality of processor elements which feeds each of said processor elements identical local memory addresses, identical switching control bits, identical Boolean function selection codes, and distinct activation control bits, depending on each of said processor's position in said Cube Connected Cycles Network in a prescribed fashion; and
   a plurality of input/output devices connected to said network by a plurality of switching devices wherein,
   said cube connected cycles consist of $Q * 2^Q$ processing elements arranged in $2^Q$ cycles of Q processing elements each, wherein each processing element X is numbered by a pair of $X_c$, $X_p$ where $X_c$ is the cycle number to which processing element X belongs and $X_p$ is processing elements X's position number within its cycle and wherein connections are provided between each processing element and its successor, predecessor and lateral neighbors defined between processing element (c, p) and the processing elements numbered (C, (p+1) mod Q), (C,(p−1) mod Q), and (D, p) such that the absolute value of $C-D=2^P$.

7. A single instruction multiple data processor according to claim 1 wherein said plurality of processing elements are formed in an array wherein each of said processing elements has at least as much silicon area, on the same chip, devoted to the bits of addressable memory accessable to each of said processing elements, as is devoted to the Boolean Logic and information routing circuitry within said each processing element and wherein in said bits of addressable memory includes any of at least 100 bits of addressable memory and wherein said processing elements provide for a computation of the SUM and CARRY bits of a single-bit binary addition in one memory cycle.

* * * * *